(12) United States Patent
Goto

(10) Patent No.: US 9,779,086 B2
(45) Date of Patent: Oct. 3, 2017

(54) LEARNING APPARATUS, TRANSLATION APPARATUS, LEARNING METHOD, AND TRANSLATION METHOD

(71) Applicant: National Institute of Information and Communications Technology, Tokyo (JP)

(72) Inventor: Isao Goto, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 0 days.

(21) Appl. No.: 15/101,266

(22) PCT Filed: Dec. 4, 2014

(86) PCT No.: PCT/JP2014/082058
§ 371 (c)(1),
(2) Date: Jun. 2, 2016

(87) PCT Pub. No.: WO2015/083762
PCT Pub. Date: Jun. 11, 2015

(65) Prior Publication Data
US 2016/0306793 A1    Oct. 20, 2016

(30) Foreign Application Priority Data

Dec. 4, 2013 (JP) .................................. 2013-251524

(51) Int. Cl.
*G06F 17/28* (2006.01)
*G06F 17/27* (2006.01)
*G06N 99/00* (2010.01)

(52) U.S. Cl.
CPC ...... *G06F 17/2836* (2013.01); *G06F 17/2705* (2013.01); *G06F 17/289* (2013.01); *G06F 17/2818* (2013.01); *G06N 99/005* (2013.01)

(58) Field of Classification Search
CPC ....................................................... G06F 17/28
(Continued)

(56) References Cited

U.S. PATENT DOCUMENTS 5,867,811 A * 2/1999 O'Donoghue ...... G06F 17/2827
704/1
6,085,162 A * 7/2000 Cherny ............... G06F 17/2735
704/2

(Continued)

FOREIGN PATENT DOCUMENTS

JP    2013-54607 A    3/2013
JP    2013-218524 A    10/2013

OTHER PUBLICATIONS

International Search Report PCT/JP2014/082058 dated Mar. 10, 2015 with English translation.
(Continued)

*Primary Examiner* — Jesse Pullias
(74) *Attorney, Agent, or Firm* — McDermott Will & Emery LLP

(57) ABSTRACT

In order to solve a conventional problem that an accurate translation cannot be realized, a learning apparatus includes: a parser unit parsing a target language sentence, thereby acquiring a binary tree of the target language sentence; a source language element acquiring unit acquiring one or more source language elements; a source language partial structure acquiring unit acquiring one or more source language partial structures each containing a parent node having a phrase label and two child nodes each having a phrase label or a source language element; a labeling unit providing a reordering label to the one or more source language partial (Continued)

structures; a model building unit that builds one or more parsing models each having appearance probability information regarding a labeled source language partial structure; and an accumulating unit accumulating a binary tree of a source language sentence having the one or more parsing models.

8 Claims, 17 Drawing Sheets

(58) Field of Classification Search
USPC .......................................................... 704/2–8
See application file for complete search history.

(56) References Cited

U.S. PATENT DOCUMENTS

| | | | | |
|---|---|---|---|---|
| 6,182,026 | B1 * | 1/2001 | Tillmann | G06F 17/2809 |
| | | | | 704/2 |
| 6,195,631 | B1 * | 2/2001 | Alshawi | G06F 17/2827 |
| | | | | 704/2 |
| 6,236,958 | B1 * | 5/2001 | Lange | G06F 17/2827 |
| | | | | 704/8 |
| 2006/0142995 | A1 * | 6/2006 | Knight | G06F 17/227 |
| | | | | 704/9 |
| 2012/0316862 | A1 | 12/2012 | Sultan et al. | |

OTHER PUBLICATIONS

Takuya Nishimura et al., "Einichi SMT eno Head-Final Seiyaku no Donyu", The Association for Natural Language Processing Dai 17 Kai Nenji Taikai Happyo Ronbushu Tutorial Honkaigi Workshop, Mar. 7, 2011, pp. 167-170.

Hiroshima Yamaota et al., "Tokei Hon'yaku ni okeru Kobungi o Mochiita Gojun Seiyaku no Donyu", The association for Natural Language Processing Dai 14 Kai Nenji Taikai Happyo Ronbunshu, Mar. 17, 2008, pp. 57-60.

Hideki Isozaki et al., "Head Finalization: A Simple Reordering Rule for SOV Languages", In Proceedings of the Joint Fifth Workshop on Statistical Machine Translation and MetricsMATR, Uppsala, Sweden, 2010, pp. 244-251.

Graham Neubig et al., "Inducing a discriminative parser to optimize machine translation reordering", In Proceedings of the 2012 Joint Conference on Empirical Methods in Natural Language Processing and Computational Natural Language Learning, Jeju Island, Korea, Jul. 2012, Association for Computational Linguistics, pp. 843-853.

Extended European Search Report issued in corresponding European Application No. 14866862.7, dated Jun. 30, 2017.

Karthik Visweswariah et al: "Syntax based reordering with automatically derived rules for improved statistical machine translation", Computational Linguistics, Association for Computational Linguistics, N. Eight Street, Stroudsburg, PA, 18360 07960-1961 USA, Aug. 23, 2010 (Aug. 23, 2010), pp. 1119-1127.

Wenbin Jiang et al: "Relaxed Cross-lingual Projection of Constituent Syntax", Proceedings of the 2011 Conference on Empirical Methods in Natural Language Processing, Jul. 27, 2011 (Jul. 27, 2011), pp. 1192-1201.

Isao Goto et al: "Post-Ordering by Parsing with ITG for Japanese-English Statistical Machine Translation", ACM Transactions on Asian Language Information Processing, vol. 12, No. 4, Oct. 1, 2013 (Oct. 1, 2013), pp. 17:1-17:22.

Hideki Isozaki et al: "HPSG-Based Preprocessing for English-to-Japanese Translation", ACM Transactions on Asian Language Information Processing, vol. 11, No. 3, Sep. 1, 2012 (Sep. 1, 2012), pp. 8:1-8:16.

John Denero et al: "Inducing Sentence Structure from Parallel Corpora for Reordering", Proceedings of the 2011 Conference on Empirical Methods in Natural Language Processing, Jul. 27, 2011 (Jul. 27, 2011), pp. 193-203.

* cited by examiner

|  | Parser | Preordering | NTCIR-9 RIBES | NTCIR-9 BLEU | NTCIR-10 RIBES | NTCIR-10 BLEU |
|---|---|---|---|---|---|---|
| PBMT$_L$ |  |  | 68.79 | 30.92 | 68.30 | 31.07 |
| HPBMT |  |  | 70.11 | 30.29 | 69.69 | 30.77 |
| SBMT | ✔ |  | 72.54 | 31.94 | 71.32 | 32.40 |
| PBMT$_D$ |  |  | 73.54 | 33.14 | 72.23 | 33.87 |
| LADER |  | ✔ | 74.53 | 33.10 | 73.86 | 33.87 |
| PROPOSED | ✔ | ✔ | 76.33 | 34.12 | 76.04 | 34.80 |

FIG.15

LEARNING APPARATUS, TRANSLATION APPARATUS, LEARNING METHOD, AND TRANSLATION METHOD

CROSS-REFERENCE TO RELATED APPLICATIONS

This application is the U.S. National Phase of PCT/JP2014/082058 filed Dec. 4, 2014, which claims priority to Japanese Patent Application No. 2013-251524 filed Dec. 4, 2013. The subject matter of each is incorporated herein by reference in entirety.

TECHNICAL FIELD

The present invention relates to a learning apparatus and the like for learning models for use in machine translations.

BACKGROUND ART

Conventionally, in machine translations, there is an approach called preordering that reorders words before selection of translated words, as one of the word reordering methods.

In existing preordering approaches, many approaches using source language parsers have been proposed (see Non-Patent Document 1, for example).

Also, approaches using no parser have been proposed (see Non-Patent Document 2, for example).

CITATION LIST

Non-Patent Documents

[Non-Patent Document 1] Hideki Isoacid, Katsu Hito Sodom, Hajime Tsoumada, and Kevin Duh. 2010. Head Finalization: A Simple Reordering Rule for SOV Languages. In Proceedings of the Joint Fifth Workshop on Statistical Machine Translation and MetricsMATR, Uppsala, Sweden, 244-251.

[Non-Patent Document 2] Graham Neubig, Taro Watanabe, and Shinsuke Mori. 2012. Inducing a discriminative parser to optimize machine translation reordering. In Proceedings of the 2012 Joint Conference on Empirical Methods in Natural Language Processing and Computational Natural Language Learning, pages 843-853, Jeju Island, Korea, July. Association for Computational Linguistics.

SUMMARY OF INVENTION

Technical Problem

However, the preordering approach using a source language parser in Non-Patent Document 1 cannot be used without a source language parser. Furthermore, if the performance of the source language parser is low, the performance of the word reordering is also low.

Furthermore, the preordering approach requiring no parser in Non-Patent Document 2 is problematic in terms of the word reordering performance because this approach does not use a parser.

As a result, conventional machine translation techniques cannot realize an accurate translation.

Solution to Problem

A first aspect of the present invention is directed to a learning apparatus, including: a parallel corpus in which one or more pairs of original and translated sentences are stored, each of the pairs having a source language sentence and a target language sentence that is a result obtained by translating the source language sentence; an element pair storage unit in which one or more element pairs are stored, each of the pairs being a pair of a source language element and a target language element; a parser unit that parses a target language sentence contained in the one or more pairs of original and translated sentences, thereby acquiring a binary tree of the target language sentence, the binary tree having one or more target language partial structures each of which indicates the order of two or more elements forming the target language sentence, and contains a parent node having a phrase label, and two child nodes each of which is a child node of the parent node and has a target language phrase label, a source language POS tag, or a source language element; a source language element acquiring unit that acquires, from the one or more element pairs in the element pair storage unit, one or more elements forming a source language sentence corresponding to the target language sentence, the one or more elements being one or more source language elements corresponding to target language elements that are child nodes at terminal ends of the one or more target language partial structures contained in the binary tree of the target language sentence; a source language partial structure acquiring unit that applies a structure indicated by the one or more target language partial structures contained in the binary tree of the target language sentence, to the one or more source language elements forming the source language sentence, thereby acquiring one or more source language partial structures each of which indicates the order of two or more elements forming the source language sentence, and contains a parent node having a phrase label, and two child nodes each of which is a child node of the parent node and has a phrase label or a source language POS tag; a labeling unit that provides the one or more source language partial structures with a reordering label that is a label that makes it possible to distinguish a source language partial structure in which the order of two child nodes contained in a source language partial structure corresponding to a target language partial structure is different from the order of two child nodes contained in the target language partial structure from a source language partial structure in which the order of two child nodes contained in a source language partial structure corresponding to a target language partial structure is the same as the order of two child nodes contained in the target language partial structure, thereby acquiring one or more labeled source language partial structures; a model building unit that builds one or more parsing models each having appearance probability information regarding a labeled source language partial structure, using the one or more labeled source language partial structures; and an accumulating unit that accumulates the one or more parsing models built by the model building unit.

With this configuration, it is possible to learn a model that can realize an accurate translation.

Furthermore, a second aspect of the present invention is directed to the learning apparatus according to the first aspect, further including a reordering unit that acquires, using the one or more source language partial structures each indicating the order of the two or more elements forming the source language sentence, one or more source language partial structures in each of which the two or more elements forming the source language sentence are reordered such that the order is close enough to satisfy a predetermined condition with respect to the order of the elements in the target language sentence, wherein the labeling unit provides the reordering label to the one or more source language partial structures reordered by the reordering unit.

With this configuration, it is possible to learn a model that can realize a more accurate translation.

Furthermore, a third aspect of the present invention is directed to the learning apparatus according to the first or second aspect, further including a statistical model storage unit in which a CFG rule statistical model is stored, the statistical model containing a parent node having a phrase label, and two child nodes each of which is a child node of the parent node and has a phrase label or a source language POS tag, wherein the source language partial structure acquiring unit includes: a source language partial structure acquiring part that applies a structure indicated by the one or more target language partial structures contained in the binary tree of the target language sentence, to the one or more source language elements forming the source language sentence, thereby acquiring one or more source language partial structures each of which indicates the order of two or more elements forming the source language sentence, and contains a parent node having a phrase label, and two child nodes each of which is a child node of the parent node and has a phrase label or a source language element; and a partial structure complementing part that, in a case where there is an incomplete source language partial structure among the one or more source language partial structures acquired by the source language partial structure acquiring part, applies the statistical model to the source language partial structure, thereby acquiring a complete source language partial structure.

With this configuration, it is possible to learn a model that can realize a more accurate translation.

Furthermore, a fourth aspect of the present invention is directed to a translation apparatus, including a binary tree storage unit in which one or more parsing models accumulated by the learning apparatus according to any one of the first to third aspects are stored; an element pair storage unit in which two or more element pairs are stored, each of the pairs being a pair of a source language element and a target language element; a receiving unit that receives a source language sentence; a labeled source language partial structure acquiring unit that acquires one or more labeled source language partial structures, from two or more elements contained in the source language sentence received by the receiving unit, using the one or more parsing models; a translation reordering unit that, in a case where a reordering label contained in the one or more labeled source language partial structures is a reordering label indicating that the order of two child nodes contained in a target language partial structure is different from the order of two child nodes contained in a source language partial structure, performs processing that reorders the two child nodes contained in a labeled source language partial structure corresponding to the reordering label, thereby acquiring two or more source language elements after reordering; a search unit that acquires, from the element pair storage unit, two or more target language elements respectively corresponding to the two or more source language elements acquired by the translation reordering unit; and an output unit that outputs a target language sentence constituted by the two or more elements acquired by the search unit.

With this configuration, it is possible to realize an accurate translation.

Furthermore, a fifth aspect of the present invention is directed to the translation apparatus according to the fourth aspect, wherein source language elements contained in one or more labeled source language partial structures forming one or more binary trees of the source language sentence are POS-tagged, the translation apparatus further includes a morphological analysis unit that performs morphological analysis on the source language sentence received by the receiving unit, thereby acquiring two or more POS-tagged elements, and the labeled source language partial structure acquiring unit acquires one or more labeled source language partial structures from the two or more POS-tagged elements, using the one or more binary trees of the source language sentence.

With this configuration, it is possible to realize a more accurate translation.

Advantageous Effects of Invention

According to the learning apparatus of the present invention, it is possible to learn a model that can realize an accurate translation.

BRIEF DESCRIPTION OF DRAWINGS

FIG. 15 is a table showing evaluation results of translation quality in the embodiment.

DESCRIPTION OF EMBODIMENTS

Figure 1:
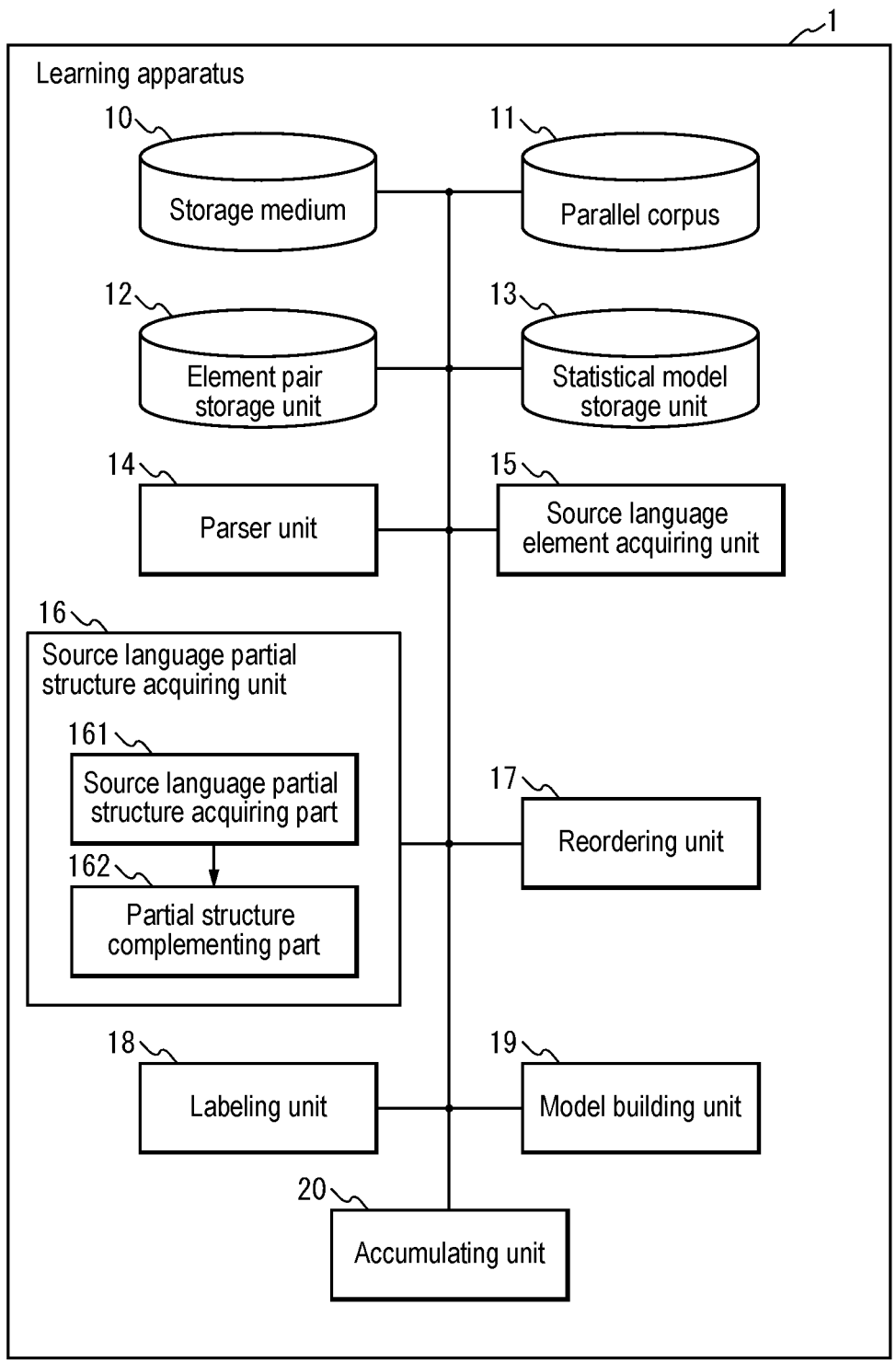
FIG. 1 is a block diagram of a learning apparatus 1 in Embodiment 1 of the present invention.

Hereinafter, embodiments of a learning apparatus and the like will be described with reference to the drawings. Note that constituent elements denoted by the same reference numerals perform similar operations in the embodiments, and, thus, a description thereof may not be repeated.

Embodiment 1 of the Invention

In this embodiment, a learning apparatus that learns a model of preordering will be described. In this embodiment, a learning apparatus that learns a model of preordering based on constraints in which reordering is performed within a certain range during translation will be described. Furthermore, in this embodiment, a learning apparatus using a statistical model will be described.

FIG. 1 is a block diagram of a learning apparatus 1 in this embodiment.

The learning apparatus 1 includes a storage medium 10, a parallel corpus 11, an element pair storage unit 12, a statistical model storage unit 13, a parser unit 14, a source language element acquiring unit 15, a source language partial structure acquiring unit 16, a reordering unit 17, a labeling unit 18, a model building unit 19, and an accumulating unit 20.

The source language partial structure acquiring unit 16 includes a source language partial structure acquiring part 161 and a partial structure complementing part 162.

In the storage medium 10, a model of preordering (hereinafter, referred to as a "preordering model" as appropriate) can be stored. The preordering model is one or more parsing models accumulated by the accumulating unit 20. Each parsing model is a binary tree of a source language sentence. The binary tree of a source language sentence is a binary tree that may be constituted by a source language sentence. This binary tree has one or more labeled source language partial structures. The parsing model typically has appearance probability information regarding a labeled source language partial structure. Each labeled source language partial structure contains a parent node and two child nodes. The parent node has a phrase label. The parent node may be, for example, a phrase label itself, or the parent node may have an ID for identifying the parent node and a phrase label. The parent node may have information for identifying child nodes in a lower level thereof. The parent node typically has a reordering label. The two child nodes are nodes in a lower level of the corresponding parent node, and may be referred to as sibling nodes. Each child node has a phrase label or a source language element. The child node may be a phrase label or a source language element itself, or the child node may have an ID for identifying the child node, and a phrase label or a source language element. There is no limitation on the data structure of the parent node and the child nodes. Note that the phrase label is information indicating part of speech, and is, for example, a POS tag. The POS tag is information indicating part of speech. The parent node and the child nodes may have a hidden class of their corresponding elements (words, etc.). The hidden class is a group identifier in a case where the elements are divided into groups. An example of a parsing model is "0.01 S_ST→NP_ST VP_SW" "0.005 S_ST$^1$→NP_ST$^2$ VP_SW$^4$". Note that the numbers added to the right sides of the labels indicate hidden classes. Each hidden class is a group identifier in a case where the elements (words, etc.) are divided into groups.

The phrase label is information for identifying a phrase type, and is, for example, "S" (indicating that it is a sentence), "VP" (indicating that it is a verb phrase), "NP" (indicating that it is a noun phrase), or the like.

Furthermore, the reordering label is a label that makes it possible to distinguish a first type of source language partial structure from a second type of source language partial structure. The first type of source language partial structure is a source language partial structure in which the order of two child nodes contained in a source language partial structure corresponding to a target language partial structure is different from the order of two child nodes contained in the target language partial structure. The second type of source language partial structure is a source language partial structure in which the order of two child nodes contained in a source language partial structure corresponding to a target language partial structure is the same as the order of two child nodes contained in the target language partial structure.

The reordering label is, for example, "_SW", which is a label indicating that reordering is to be performed, "_ST", which is a label indicating that reordering is not to be performed, or the like. Both of the first type of source language partial structure and the second type of source language partial structure may be provided with the reordering label, or one of the source language partial structures may be provided with the reordering label. The reordering label is typically held by a parent node of a source language partial structure. Note that "ST" is an abbreviation for "straight", and "SW" is an abbreviation for "switch".

Furthermore, the phrase label and the reordering label may be expressed together. In this case, the phrase label and the reordering label are expressed, for example, as "phrase label_reordering label", such as "S_ST", "VP_SW", "NP_ST", or the like. Note that "S_ST" indicates that the source language partial structure forms a sentence and reordering is not to be performed. "VP_SW" indicates that the source language partial structure forms a verb phrase and reordering is to be performed. Furthermore, "NP_ST" indicates that the source language partial structure forms a noun phrase and reordering is not to be performed.

The preordering model is based on, for example, an analysis using CFG (context-free grammar) having probability information and a basic framework of ITG (inversion transduction grammar) (see "Dekai Wu. 1997. Stochastic inversion transduction grammars and bilingual parsing of parallel corpora. Computational Linguistics, 23(3): 377-403."). This preordering model may be referred to as an ITG parsing model.

In the parallel corpus 11, one or more pairs of original and translated sentences can be stored. Each pair of original and translated sentences has a source language sentence and a target language sentence. The target language sentence is a result obtained by translating the source language sentence. There is no limitation on the languages of the source language and the target language, as long as they are different languages. In this example, however, it is preferable that the source language and the target language are languages with significantly different word orders, such as Japanese and English.

In the element pair storage unit 12, one or at least two element pairs can be stored. Each element pair is a pair of a source language element and a target language element. The element is a portion forming a sentence, such as a word, a morpheme, a phrase, or the like. The element may be two or more word sequences or sentences. The element pair may have information regarding correspondence probability between a source language element and a target language element. The element pair storage unit 12 may be a so-called word dictionary.

In the statistical model storage unit 13, a CFG rule statistical model can be stored. The CFG rule contains a parent node and two child nodes. In this example, the parent node has a phrase label. Each child node has a phrase label or a source language POS tag.

The statistical model is, for example, a CFG model having probability information. As a part for building the CFG model, for example, a Pitman-Yor (hereinafter, referred to as "PY" as appropriate) process is used. The PY process is a known art, and, thus, a detailed description thereof has been omitted. Regarding the PY process, see "Jim Pitman and Marc Yor. 1997. The two-parameter poisson-dirichlet distribution derived from a stable subordinator. The Annals of Probability, 25(2): 855-900.".

A CFG rule set is taken as R, a syntactic phrase label set of a target language is taken as L, and a POS tag set of a source language is taken as T. In this case, a probability "P(t)" of a derivation tree t is expressed as in Formula 1 below. Note that the derivation tree t is a syntactic structure of a source language tree structure.

$$P(t) = \prod_{x \to \alpha \in R} P(\alpha | x)^{c(x \to \alpha, t)}$$  Formula 1

In Formula 1, "x→α" is a CFG rule, "c(x→α,t)" is the number of "x→α" used in the derivation tree t, "x∈L" is a phrase label of a parent node of the CFG rule, and "P(α|x)" is a probability that α is generated in the case where a phrase label "x" of a parent node is given. The designated phrase label is used as a phrase label of the parent node of the derivation tree t.

Furthermore, the PY model is a distribution of the CFG rule, and is expressed as in Formula 2 below.

$$P(\alpha|x) \sim PY_x(d, \theta, P_{base}(\alpha|x))$$  Formula 2

In Formula 2, "d" and "θ" are hyperparameters of the PY model.

Furthermore, a back-off probability "$P_{base}(\alpha|x)$" may be, for example, a constant as shown in Formula 3 below. The back-off probability is a probability used when performing back-off smoothing.

$$P_{base}(\alpha | x) = \frac{1}{(|L| + |T|)^2}$$  Formula 3

In Formula 3, "|L|" is the number of syntactic phrase label types of the target language, and "|T|" is the number of POS tag types of the source language. In this example, the CFG rule has two child nodes, and the child nodes have a phrase label or a POS tag, and thus the number of pair-forming child node types is "$(|L|+|T|)^2$".

The parser unit 14 acquires one or more binary trees of a target language sentence. Each binary tree has one or more target language partial structures. The parser unit 14 typically parses a target language sentence contained in the one or more pairs of original and translated sentences, and acquires one or more binary trees of the target language sentence. Note that the parser unit 14 may transmit a target language sentence contained in one or more pairs of original and translated sentences to an external apparatus, and receive one or more binary trees of the target language sentence from the external apparatus. The parser unit 14 may be realized, for example, by a parser such as a Berkeley parser (Slav Petrov, Leon Barrett, Romain Thibaux, and Dan Klein. 2006. Learning accurate, compact, and interpretable tree annotation, In Proceedings of COLING-ACL 2006. pages 433-440, Sydney, Australia, July. Association for Computational Linguistics.). The target language partial structure indicates the order of two or more elements forming the target language sentence, and contains a parent node having a phrase label, and two child nodes each of which is a child node of the parent node and has a target language phrase label, a source language POS tag, or a source language element.

Furthermore, each binary tree of the target language sentence is a syntactic tree based on phrase structure grammar obtained by parsing the target language sentence, and has a tree structure with a maximum branch number of 2. The syntactic tree based on the phrase structure grammar is constituted by sub-trees indicating a phrase range and phrase labels.

The binary tree of the target language sentence has one or more target language partial structures. Each target language partial structure contains a parent node and two child nodes of the parent node. The parent node has a phrase label. Each child node has a phrase label or a target language element. Note that the target language element may be associated with a POS tag, which is information indicating part of speech.

The source language element acquiring unit 15 acquires one or more source language elements respectively corresponding to one or more target language elements contained in the target language sentence, from the element pair storage unit 12. The source language element acquiring unit 15 acquires one or more elements forming a source language sentence corresponding to the target language sentence, the one or more elements being one or more source language elements corresponding to target language elements that are child nodes at terminal ends of the one or more target language partial structures contained in the binary tree of the target language sentence, from the one or more element pairs in the element pair storage unit 12.

The source language partial structure acquiring unit 16 acquires one or more source language partial structures. Specifically, the source language partial structure acquiring unit 16 applies a structure indicated by the one or more target language partial structures contained in the binary tree of the target language sentence, to the one or more source language elements forming the source language sentence, thereby acquiring one or more source language partial structures. Each source language partial structure acquired by the source language partial structure acquiring unit 16 is information indicating the order of two or more elements forming the source language sentence. The source language partial structure contains a parent node and two child nodes. The parent node has a phrase label. Each child node has a phrase label or a source language element. The source language partial structure indicates the order of two or more elements forming the source language sentence, and contains a parent node having a phrase label, and two child nodes each of which is a child node of the parent node and has a phrase label or a source language POS tag.

More specifically, the source language partial structure acquiring unit 16 determines, for the source language partial structures, spans respectively corresponding to the spans of the one or more target language partial structures contained in the binary tree of the target language sentence, using the one or more element pairs in the element pair storage unit 12. In this example, each span refers to a range between two word positions. The source language partial structure acquiring unit 16 writes a phrase label of a parent node of a target language partial structure corresponding to a source language partial structure, as a phrase label of a parent node of the source language partial structure corresponding to each span. Note that each span of the source language partial structure is a span from a position corresponding to the leftmost element in the corresponding target language partial structure to a position corresponding to the rightmost element in the corresponding target language partial structure.

There are cases in which the source language partial structure acquiring unit 16 cannot acquire a source language partial structure having a complete structure. A source language partial structure having an incomplete structure is, for example, a source language partial structure in which the span is unknown or unclear, a source language partial structure containing a parent node whose phrase label cannot be determined, or the like. The case where the span is unknown or unclear is, for example, the case where there is an element in the source language sentence associated with no element forming the target language sentence, the case where no span can be held due to conflict, of the like. An unclear portion is generated typically in the case where the number of words in the source language sentence is larger than that in the target language sentence.

In the case where there is an element in the source language sentence associated with no element forming the target language sentence when using the one or more element pairs in the element pair storage unit 12, the source language partial structure acquiring unit 16 determines spans such that the unassociated element is included in its adjacent span, using the statistical model in the statistical model storage unit 13. The source language partial structure acquiring unit 16 determines a phrase label of a parent node of the source language partial structure corresponding to the span that comes to include the unassociated element, using the statistical model in the statistical model storage unit 13.

The source language partial structure acquiring unit 16 typically holds spans of the source language partial structures only in the case where there is no conflict between the source language partial structures. That is to say, the source language partial structure acquiring unit 16 typically does not hold spans that conflict with each other. In this example, a conflict refers to a state in which two or more source language spans partially overlap each other. That is to say, a conflict is not a so-called nested state but a crossed state. Note that an element portion of the source language sentence associated with no element forming the target language sentence can be free from ambiguities so as not to cause any conflict, and, thus, it is treated assuming that there is no conflict.

Furthermore, if the span of the source language partial structure is ambiguous, the source language partial structure acquiring unit 16 applies the loosest constraint to a derivation tree. Applying the loosest constraint refers to, if a conflict may or may not occur depending on the settings of constraints, due to the ambiguities of the constraints, always applying a constraint with which no conflict occurs.

If a sub-tree of a span of a derivation tree has a phrase label, the source language partial structure acquiring unit 16 extracts the phrase label. For this extraction, for example, "sentence-level blocked Gibbs sampler (see Trevor Cohn, Phil Blunsom, and Sharon Goldwater. 2010. Inducing Tree-Substitution Grammars. Journal of Machine Learning Research, 11: 3053-3096.)" is used. This sampler performs two steps below on each sentence: (1) calculating an internal probability from the bottom up; and (2) sampling a tree from the top down.

After a PY model distribution is built, for example, the source language partial structure acquiring unit 16 acquires one or more best source language partial structures using probability information-containing CFG and CYK algorithms (see Daniel H. Younger (1967). Recognition and parsing of context-free languages in time $n^3$. Information and Control 10(2): 189-208.). The CYK algorithm searches for the most likely syntactic structure from among syntactic structures satisfying the constraint of the span and the phrase label of the source language partial structure. This constraint is the same as the constraint used to form the probability information-containing CFG.

The source language partial structure acquiring part 161 forming the source language partial structure acquiring unit 16 acquires one or more source language partial structures. There are cases in which the source language partial structure acquiring part 161 cannot acquire a complete source language partial structure.

If there is an incomplete source language partial structure among the one or more source language partial structures acquired by the source language partial structure acquiring part 161, the partial structure complementing part 162 applies the statistical model in the statistical model storage unit 13 to the source language partial structure, thereby acquiring a complete source language partial structure. The incomplete source language partial structure is as described above.

If the source language partial structure acquiring part 161 acquires a source language partial structure containing a parent node whose phrase label cannot be determined, the partial structure complementing part 162 applies the statistical model to the source language partial structure, thereby determining the phrase label of the parent node of the source language partial structure. Determining the phrase label may be writing a determined phrase label, as the phrase label of the parent node of the source language partial structure. In this example, the statistical model is typically the CFG rule statistical model.

The reordering unit 17 reorders the two or more elements forming the source language sentence, using the one or more source language partial structures each indicating the order of the two or more elements forming the source language sentence. The reordering unit 17 acquires one or more source language partial structures, as a reordering result. The reordering unit 17 typically reorders the two or more elements forming the source language sentence such that the order is close enough to satisfy a predetermined condition with respect to the order of the elements in the target language sentence. In this example, the close order refers to a state in which the order of the elements in the target language sentence is close to the order of the elements in the source language sentence.

For example, the reordering unit 17 may or may not reorder the sibling nodes in the source language partial structure such that "Kendall t" between the source language partial structure after reordering and the target language partial structure becomes maximum. In this example, "Kendall t" is a type of rank correlation coefficient.

The labeling unit 18 provides a reordering label to the one or more source language partial structures, thereby acquiring one or more labeled source language partial structures. The labeling unit 18 typically provides a reordering label to the one or more source language partial structures reordered by the reordering unit 17, thereby acquiring one or more labeled source language partial structures.

The labeling unit 18 provides a reordering label, for example, only to the first type of source language partial structures. This reordering label is a label indicating that reordering is to be performed. The labeling unit 18 provides a reordering label, for example, only to the second type of source language partial structures. This reordering label is a label indicating that reordering is not to be performed. For example, the labeling unit 18 may provide a reordering label (e.g., "_SW") indicating that reordering is to be performed, to the first type of source language partial structures, and may provide a reordering label (e.g., "_ST") indicating that reordering is not to be performed, to the second type of source language partial structures.

The model building unit 19 builds one or more parsing models (e.g., ITG parsing models), using the one or more labeled source language partial structures acquired by the labeling unit 18. The model building unit 19 may be realized, for example, by the model learning function of the Berkeley parser.

The accumulating unit 20 accumulates the one or more parsing models acquired by the model building unit 19. The accumulating unit 20 typically accumulates the one or more parsing models in the storage medium 10.

The storage medium 10, the parallel corpus 11, the element pair storage unit 12, and the statistical model storage unit 13 are preferably a non-volatile storage medium, but may be realized also by a volatile storage medium.

There is no limitation on the procedure in which the pairs of original and translated sentences and the like are stored in the parallel corpus 11 and the like. For example, the pairs of original and translated sentences and the like may be stored in the parallel corpus 11 and the like via a storage medium, the pairs of original and translated sentences and the like transmitted via a communication line or the like may be stored in the parallel corpus 11 and the like, or the pairs of original and translated sentences and the like input via an input device may be stored in the parallel corpus 11 and the like.

The parser unit 14, the source language element acquiring unit 15, the source language partial structure acquiring unit 16, the reordering unit 17, the labeling unit 18, the model building unit 19, the accumulating unit 20, the source language partial structure acquiring part 161, and the partial structure complementing part 162 may be realized typically by an MPU, a memory, or the like. Typically, the processing procedure of the parser unit 14 and the like is realized by software, and the software is stored in a storage medium such as a ROM. Note that the processing procedure may be realized by hardware (a dedicated circuit).

Next, an operation of the learning apparatus 1 will be described with reference to the flowcharts in FIGS. 2 and 3.

(Step S201) The parser unit 14 substitutes 1 for a counter i.

(Step S202) The parser unit 14 determines whether or not there is an $i\text{-}^{th}$ pair of original and translated sentences in the parallel corpus 11. If there is an $i\text{-}^{th}$ pair of original and translated sentences, the procedure advances to step S203, otherwise, the procedure is ended.

(Step S203) The parser unit 14 reads an $i\text{-}^{th}$ target language sentence contained in the $i\text{-}^{th}$ pair of original and translated sentences, from the parallel corpus 11.

(Step S204) The parser unit 14 parses the target language sentence read in step S203. The parser unit 14 acquires a target language binary tree corresponding to the $i\text{-}^{th}$ target language sentence. The target language binary tree has one or more target language partial structures.

(Step S205) The source language element acquiring unit 15 reads an $i\text{-}^{th}$ source language sentence contained in the $i\text{-}^{th}$ pair of original and translated sentences, from the parallel corpus 11.

(Step S206) The source language element acquiring unit 15 substitutes 1 for a counter j.

(Step S207) The source language element acquiring unit 15 determines whether or not there is a child node at a $j\text{-}^{th}$ terminal end in the target language binary tree acquired in step S204. If there is a child node at a $j\text{-}^{th}$ terminal end, the procedure advances to step S208, otherwise, the procedure advances to step S210. The child node at the terminal end is an element such as a word in the target language.

(Step S208) The source language element acquiring unit 15 acquires an element contained in the $i\text{-}^{th}$ source language sentence, the element being a word or the like in the source language corresponding to the child node at the $j\text{-}^{th}$ terminal end (target language element), from the element pair storage unit 12.

(Step S209) The source language element acquiring unit 15 increments the counter j by 1, and the procedure returns to step S207.

(Step S210) The source language partial structure acquiring part 161 forming the source language partial structure acquiring unit 16 substitutes 1 for a counter j.

(Step S211) The source language partial structure acquiring part 161 determines whether or not there is a $j\text{-}^{th}$ target language partial structure in the target language binary tree acquired in step S204. If there is a $j\text{-}^{th}$ target language partial structure, the procedure advances to step S212, otherwise, the procedure advances to step S214.

(Step S212) The source language partial structure acquiring part 161 constructs a source language partial structure corresponding to the $j\text{-}^{th}$ target language partial structure.

(Step S213) The source language partial structure acquiring part 161 increments the counter j by 1, and the procedure returns to step S211.

(Step S214) The partial structure complementing part 162 substitutes 1 for a counter j.

(Step S215) The partial structure complementing part 162 determines whether or not there is a $j\text{-}^{th}$ source language partial structure. If there is a j-th source language partial structure, the procedure advances to step S216, otherwise, the procedure advances to step S219.

(Step S216) The partial structure complementing part 162 determines whether or not the $j\text{-}^{th}$ source language partial structure is an incomplete source language partial structure. If it is an incomplete source language partial structure, the procedure advances to step S217, otherwise, the procedure advances to step S218.

(Step S217) The partial structure complementing part 162 changes the $j\text{-}^{th}$ source language partial structure to a complete source language partial structure, using the statistical model.

(Step S218) The partial structure complementing part 162 increments the counter j by 1, and the procedure returns to step S215.

(Step S219) The reordering unit 17 substitutes 1 for a counter j.

(Step S220) The reordering unit 17 determines whether or not there is a $j\text{-}^{th}$ source language partial structure. If there is a $j\text{-}^{th}$ source language partial structure, the procedure advances to step S221, otherwise, the procedure advances to step S224.

(Step S221) The reordering unit 17 determines whether or not the $j\text{-}^{th}$ source language partial structure is a source language partial structure that has to be reordered. If it is determined that the structure has to be reordered, the procedure advances to step S222, otherwise, the procedure advances to step S223.

(Step S222) The reordering unit 17 reorders the sibling nodes contained in the $j\text{-}^{th}$ source language partial structure.

(Step S223) The reordering unit 17 increments the counter j by 1, and the procedure returns to step S220.

(Step S224) The labeling unit 18 substitutes 1 for a counter j.

(Step S225) The labeling unit 18 determines whether or not there is a j-$^{th}$ source language partial structure. If there is a j-$^{th}$ source language partial structure, the procedure advances to step S226, otherwise, the procedure advances to step S230.

(Step S226) The labeling unit 18 determines whether or not reordering occurs in the j-$^{th}$ source language partial structure. If reordering occurs, the procedure advances to step S227, otherwise, the procedure advances to step S228.

(Step S227) The labeling unit 18 provides a label (e.g., "_SW") indicating that reordering is to be performed, to the j-$^{th}$ source language partial structure.

(Step S228) The labeling unit 18 provides a label (e.g., "_ST") indicating that reordering is not to be performed, to the j-$^{th}$ source language partial structure.

(Step S229) The labeling unit 18 increments the counter j by 1, and the procedure returns to step S225.

(Step S230) The model building unit 19 builds one or more parsing models, using the one or more labeled source language partial structures acquired by the labeling unit 18. The accumulating unit 20 accumulates the one or more parsing models acquired by the model building unit 19, in the storage medium 10.

(Step S231) The parser unit 14 increments the counter i by 1, and the procedure returns to step S202.

It will be appreciated that, the order of the steps and the like in the flowcharts are merely an example.

In the description above, the labeling unit 18 provides a label (e.g., "_SW") indicating that reordering is to be performed or a label (e.g., "_ST") indicating that reordering is not to be performed to the source language partial structures. However, the labeling unit 18 may provide the reordering labels to a part of the source language partial structures. Even in the case where the reordering labels are provided to only a part of the source language partial structures, it is possible to know whether or not a source language partial structure is a source language partial structure that is to be reordered.

Figure 2:
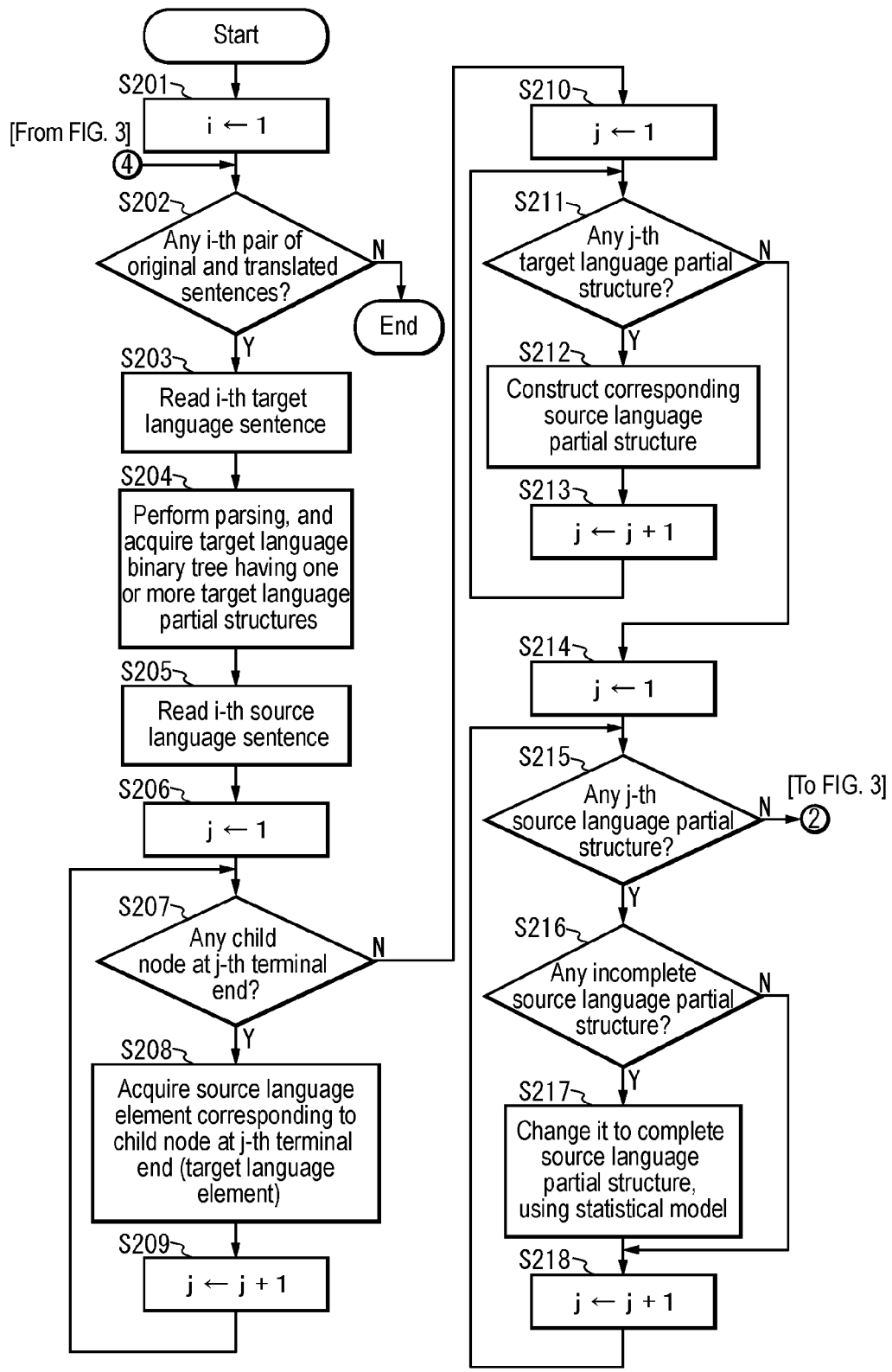
FIG. 2 is a flowchart illustrating an operation of the learning apparatus 1 in the embodiment.
Figure 3:
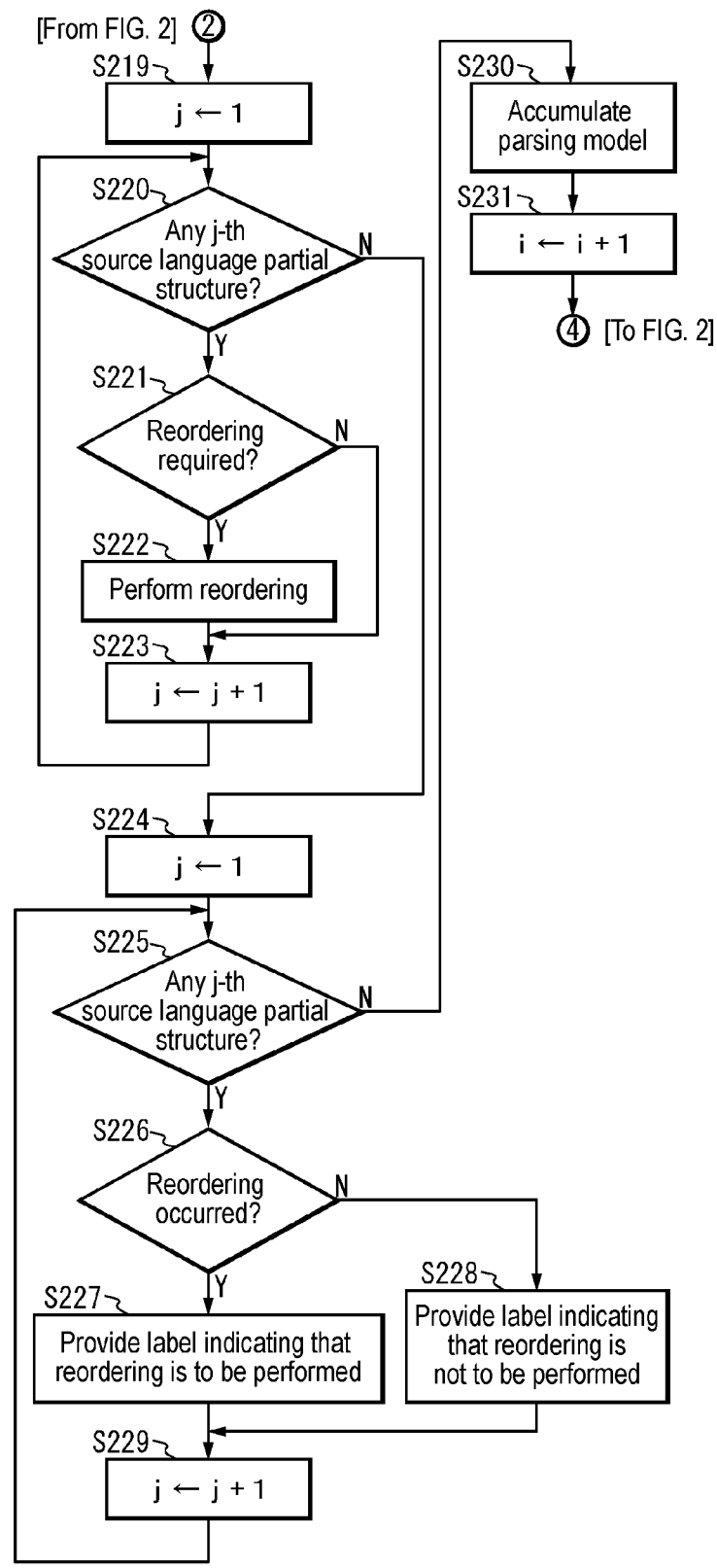
FIG. 3 is a flowchart illustrating an operation of the learning apparatus 1 in the embodiment.

Note that the procedure is terminated by powering off or an interruption at completion of the process in the flowcharts in FIGS. 2 and 3.

Hereinafter, a specific operation of the learning apparatus 1 in this embodiment will be described.

For example, it is assumed that the source language is Japanese and the target language is English. Furthermore, it is assumed that, in the parallel corpus 11, "Japanese sentence: kare wa kinou shinkan no hon wo kat ta, English sentence: he bought new books yesterday" is stored.

Furthermore, it is assumed that, in the element pair storage unit 12, Japanese-English word dictionary data containing a large number of element pairs having Japanese words and English words is stored. The element pairs are, for example, (kare, he), (kinou, yesterday), and the like.

Furthermore, it is assumed that, in the statistical model storage unit 13, the above-described CFG rule statistical model is stored.

In this situation, the learning apparatus 1 operates as follows.

First, the parser unit 14 of the learning apparatus 1 reads the target language sentence "he bought new books yesterday" in the parallel corpus 11.

Figure 4:
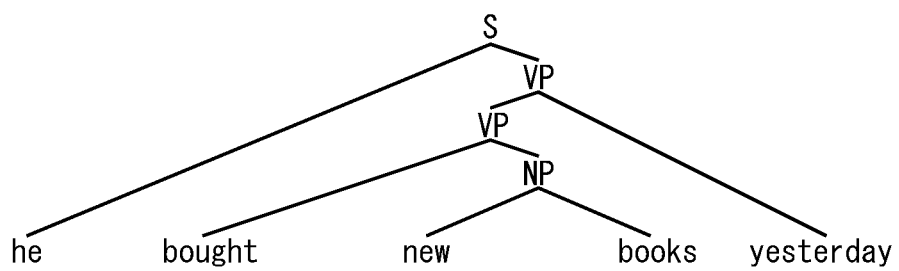
FIG. 4 is a diagram showing a binary tree acquired by a parser unit 14 in the embodiment.

Next, the parser unit 14 parses the read target language sentence. The parser unit 14 acquires a target language binary tree corresponding to the target language sentence. FIG. 4 shows this binary tree. This binary tree contains a target language partial structure having a parent node "S" and child nodes "he" and "VP", a target language partial structure having a parent node "VP" and child nodes "VP" and "yesterday", a target language partial structure having a parent node "VP" and child nodes "bought" and "NP", and a target language partial structure having a parent node "NP" and child nodes "new" and "books". The parser unit 14 is, for example, the Berkeley parser.

Next, the source language element acquiring unit 15 reads the source language sentence "Japanese sentence: kare wa kinou shinkan no hon wo kat ta" from the parallel corpus 11.

Figure 5:
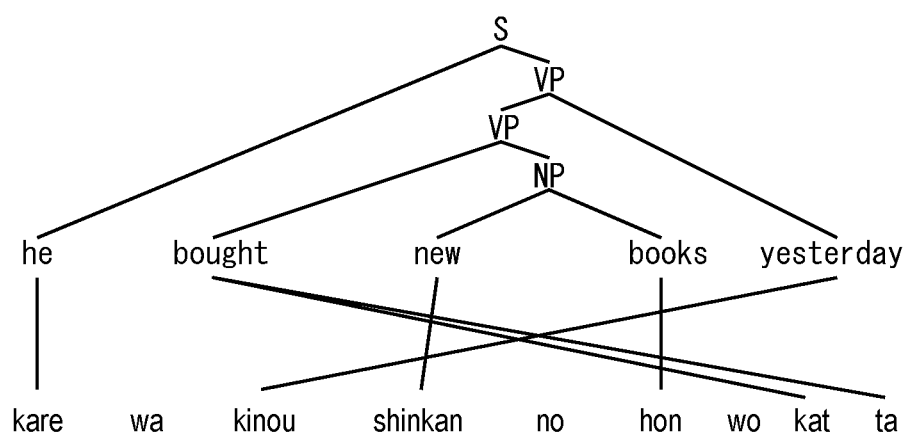
FIG. 5 is a diagram showing source language elements acquired by a source language element acquiring unit 15 in the embodiment.

Next, the source language element acquiring unit 15 acquires source language words corresponding to child nodes at terminal ends (target language words) in the target language binary tree, the source language words being words contained in the source language sentence, using the element pair storage unit 12. That is to say, as shown in FIG. 5, the source language element acquiring unit 15 acquires "kare" in association with "he", acquires "kat ta" in association with "bought", acquires "shinkan" in association with "new", acquires "hon" in association with "books", and acquires "kinou" in association with "yesterday".

Figure 6:
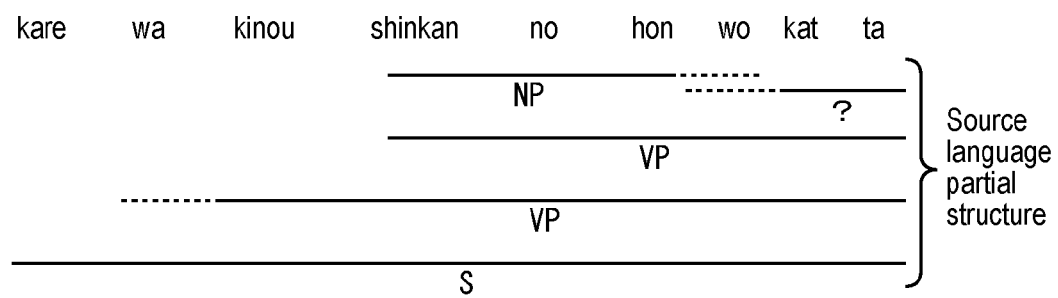
FIG. 6 is a diagram showing a concept of source language partial structures in the embodiment.

Next, the source language partial structure acquiring part 161 applies a structure indicated by the one or more target language partial structures, to the one or more source language elements forming the source language sentence, thereby acquiring one or more source language partial structures. FIG. 6 shows a concept of the one or more source language partial structures.

Figure 7:
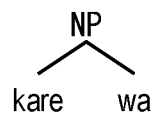
FIG. 7 is a diagram showing a source language partial structure in the embodiment.

Next, the partial structure complementing part 162 changes an incomplete source language partial structure to a complete source language partial structure, using the statistical model. For example, the partial structure complementing part 162 causes "wa" associated with no target language word to be included in its adjacent span (span of "kare"). Furthermore, the partial structure complementing part 162 acquires a phrase label "NP" of the parent node corresponding to the child node "kare" and the child node "wa", using the statistical model. Thus, a source language partial structure (partial tree) shown in FIG. 7 is obtained.

Furthermore, for example, the partial structure complementing part 162 causes "no" associated with no target language word to be included in its adjacent span (span of "shinkan"). Furthermore, the partial structure complementing part 162 acquires a phrase label "PP" of the parent node corresponding to the child node "shinkan" and the child node "no", using the statistical model.

Furthermore, for example, the partial structure complementing part 162 causes "wo" associated with no target language word to be included in its adjacent span (span of "shinkan no hon"). Furthermore, the partial structure complementing part 162 acquires a parent node "NP" corresponding to "shinkan no hon" and a phrase label "NP" of the parent node having the node "wo" as a child node, using the statistical model.

Figure 8:
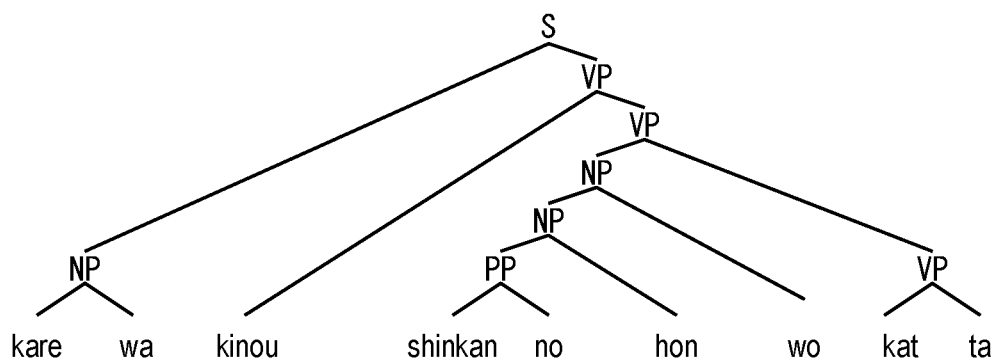
FIG. 8 is a diagram showing a binary tree having one or more source language partial structures in the embodiment.

With the above-described processing, the source language partial structure acquiring unit 16 acquires the binary tree having one or more source language partial structures shown in FIG. 8. This binary tree contains a source language partial structure having a parent node "S" and child nodes "NP" and "VP", a source language partial structure having a parent node "NP" and child nodes "kare" and "wa", a source language partial structure having a parent node "VP" and child nodes "kinou" and "VP", a source language partial structure having a parent node "VP" and child nodes "NP"

and "VP", a source language partial structure having a parent node "NP" and child nodes "NP" and "wo", a source language partial structure having a parent node "NP" and child nodes "PP" and "hon", a source language partial structure having a parent node "PP" and child nodes "shinkan" and "no", and a source language partial structure having a parent node "VP" and child nodes "kat" and "ta".

Figure 9:
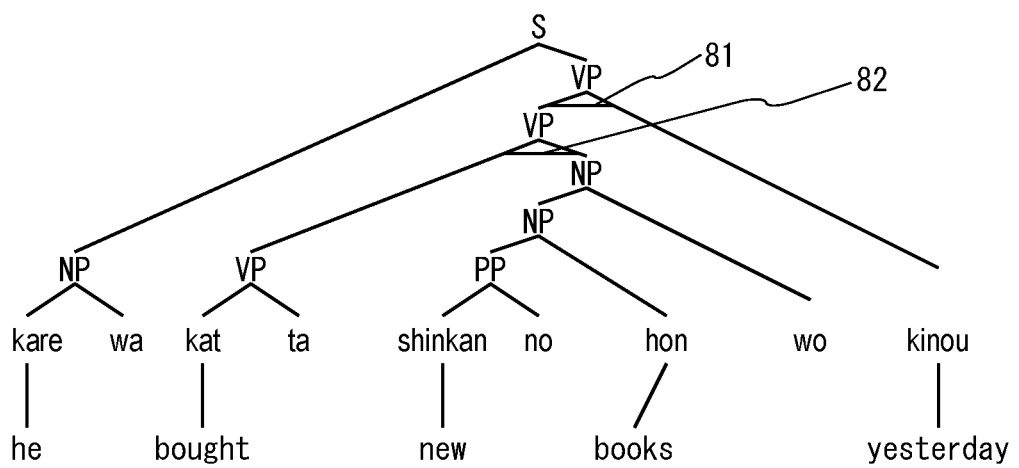
FIG. 9 is a diagram showing a binary tree having one or more source language partial structures in the embodiment.

Next, the reordering unit 17 inspects each of the one or more source language partial structures as to whether or not sibling nodes have to be reordered such that the order is close to the word order of the target language. In this example, the reordering unit 17 determines that the source language partial structure having "kinou" and "shinkan no hon wo kat ta" as the span has to be reordered, and performs reordering. Also, the reordering unit 17 determines that the source language partial structure having "shinkan no hon wo" and "kat ta" as the span has to be reordered, and performs reordering. The reordering unit 17 acquires a binary tree having the source language partial structures shown in FIG. 9. In this binary tree, the parent nodes contained in the reordered source language partial structures have "-" (81 and 82).

Next, the labeling unit 18 determines whether or not reordering occurs in each of the one or more source language partial structures. The labeling unit 18 provides a label ("_SW", in this example) indicating that reordering is to be performed, to a source language partial structure where reordering occurs. Also, the labeling unit 18 provides a label ("_ST") indicating that reordering is not to be performed, to a source language partial structure where reordering does not occur. Thus, the labeling unit 18 acquires one or more labeled source language partial structures shown in FIG. 10. The labeled source language partial structures in FIG. 10 are a labeled source language partial structure having a parent node "S_ST" and child nodes "NP_ST" and "VP_SW", a labeled source language partial structure having a parent node "NP_ST" and child nodes "kare" and "wa", a labeled source language partial structure having a parent node "VP_SW" and child nodes "kinou" and "VP_SW", a labeled source language partial structure having a parent node "VP_SW" and child nodes "NP_ST" and "VP_ST", a labeled source language partial structure having a parent node "NP_ST" and child nodes "NP_ST" and "wo", a labeled source language partial structure having a parent node "NP_ST" and child nodes "PP_ST" and "hon", a labeled source language partial structure having a parent node "PP_ST" and child nodes "shinkan" and "no", and a labeled source language partial structure having a parent node "VP_ST" and child nodes "kat" and "ta".

Figure 10:
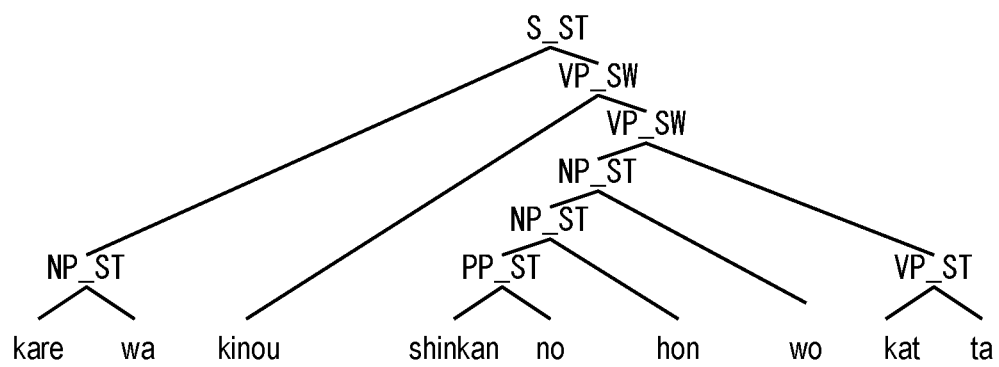
FIG. 10 is a diagram showing a binary tree having one or more labeled source language partial structures in the embodiment.

Next, the accumulating unit 20 accumulates the binary tree of the source language sentence having the labeled source language partial structures acquired by the labeling unit 18 (see FIG. 10).

The above-described processing is performed on all pairs of original and translated sentences in the parallel corpus 11. Thus, the learning apparatus 1 can learn a preordering model.

As described above, according to this embodiment, it is possible to learn a preordering model that can realize an accurate translation.

Furthermore, according to this embodiment, it is possible to learn a preordering model that can realize a more accurate translation, by reordering two or more elements forming a source language sentence such that the order is close enough to satisfy a predetermined condition with respect to the order of elements in a target language sentence.

The processing in this embodiment may be realized by software. The software may be distributed by software downloads or the like. Furthermore, the software may be distributed in a form where the software is stored in a storage medium such as a CD-ROM. Note that the same is applied to other embodiments described in this specification. The software that realizes the learning apparatus 1 in this embodiment may be the following sort of program. Specifically, this program is a program for causing a computer-accessible storage medium to have: a parallel corpus in which one or more pairs of original and translated sentences are stored, each of the pairs having a source language sentence and a target language sentence that is a result obtained by translating the source language sentence; and an element pair storage unit in which one or more element pairs are stored, each of the pairs being a pair of a source language element and a target language element; and causing a computer to function as: a parser unit that parses a target language sentence contained in the one or more pairs of original and translated sentences, thereby acquiring a binary tree of the target language sentence, the binary tree having one or more target language partial structures each of which indicates the order of two or more elements forming the target language sentence, and contains a parent node having a phrase label, and two child nodes each of which is a child node of the parent node and has a target language phrase label, a source language POS tag, or a source language element; a source language element acquiring unit that acquires, from the one or more element pairs in the element pair storage unit, one or more elements forming a source language sentence corresponding to the target language sentence, the one or more elements being one or more source language elements corresponding to target language elements that are child nodes at terminal ends of the one or more target language partial structures contained in the binary tree of the target language sentence; a source language partial structure acquiring unit that applies a structure indicated by the one or more target language partial structures contained in the binary tree of the target language sentence, to the one or more source language elements forming the source language sentence, thereby acquiring one or more source language partial structures each of which indicates the order of two or more elements forming the source language sentence, and contains a parent node having a phrase label, and two child nodes each of which is a child node of the parent node and has a phrase label or a source language POS tag; a labeling unit that provides the one or more source language partial structures with a reordering label that is a label that makes it possible to distinguish a source language partial structure in which the order of two child nodes contained in a source language partial structure corresponding to a target language partial structure is different from the order of two child nodes contained in the target language partial structure from a source language partial structure in which the order of two child nodes contained in a source language partial structure corresponding to a target language partial structure is the same as the order of two child nodes contained in the target language partial structure, thereby acquiring one or more labeled source language partial structures; a model building unit that builds one or more parsing models each having appearance probability information regarding a labeled source language partial structure, using the one or more labeled source language partial structures; and an accumulating unit that accumulates the one or more parsing models built by the model building unit.

It is preferable that the program causes the computer to further function as a reordering unit that acquires, using the one or more source language partial structures each indicating the order of two or more elements forming the source language sentence, one or more source language partial structures in each of which the two or more elements forming the source language sentence are reordered such that the order is close enough to satisfy a predetermined condition with respect to the order of the elements in the target language sentence, wherein the labeling unit provides the reordering label to the one or more source language partial structures reordered by the reordering unit.

It is preferable that the program causes the storage medium to further have a statistical model storage unit in which a CFG rule statistical model is stored, the statistical model containing a parent node having a phrase label, and two child nodes each of which is a child node of the parent node and has a phrase label or a source language POS tag, wherein the source language partial structure acquiring unit includes: a source language partial structure acquiring part that applies a structure indicated by the one or more target language partial structures contained in the binary tree of the target language sentence, to the one or more source language elements forming the source language sentence, thereby acquiring one or more source language partial structures each of which indicates the order of two or more elements forming the source language sentence, and contains a parent node having a phrase label, and two child nodes each of which is a child node of the parent node and has a phrase label or a source language element; and a partial structure complementing part that, in a case where there is an incomplete source language partial structure among the one or more source language partial structures acquired by the source language partial structure acquiring part, applies the statistical model to the source language partial structure, thereby acquiring a complete source language partial structure.

Embodiment 2 of the Invention

In this embodiment, a translation apparatus that performs machine translation using the preordering model learned by the learning apparatus 1 described in Embodiment 1 will be described.

Furthermore, in this embodiment, a translation apparatus using a source language parser will be described.

Figure 11:
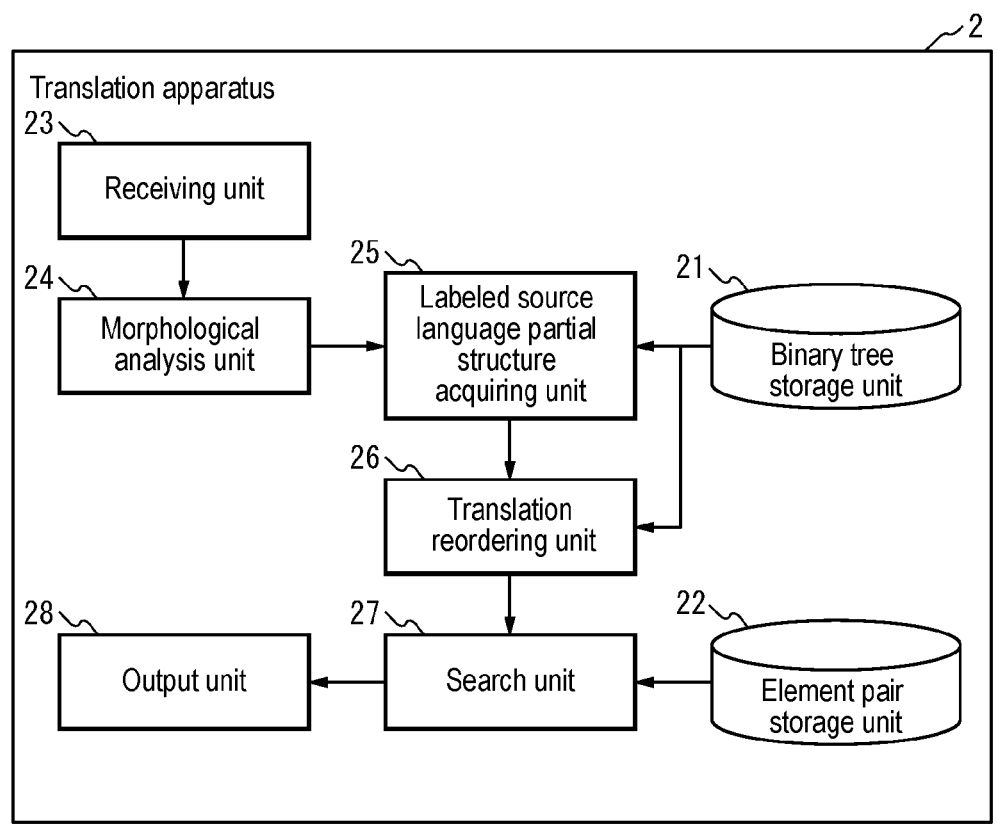
FIG. 11 is a block diagram of a translation apparatus 2 in Embodiment 2 of the present invention.

FIG. 11 is a block diagram of a translation apparatus 2 in this embodiment. The translation apparatus 2 includes a binary tree storage unit 21, an element pair storage unit 22, a receiving unit 23, a morphological analysis unit 24, a labeled source language partial structure acquiring unit 25, a translation reordering unit 26, a search unit 27, and an output unit 28.

In the binary tree storage unit 21, one or more parsing models are stored. Each parsing model has one or more labeled source language partial structures. Such one or more parsing models are the one or more parsing models accumulated by the learning apparatus 1 described in Embodiment 1. The binary tree storage unit 21 may be the same as the storage medium 10.

In the element pair storage unit 22, one or at least two element pairs can be stored, each pair being a pair of a source language element and a target language element.

The receiving unit 23 receives a source language sentence. The source language sentence is a sentence that is to be translated. Receiving is a concept that encompasses receiving information input from an input device such as a keyboard, a mouse, or a touch panel, receiving a source language sentence obtained as a result of speech recognition, receiving information transmitted via a wired or wireless communication line, receiving information read from a storage medium such as an optical disk, a magnetic disk, or a semiconductor memory, and the like. The source language sentence may be input via any part such as a keyboard, a mouse, a touch panel, a menu screen, or the like. The receiving unit 23 may be realized by a device driver for an input part such as a keyboard, control software for a menu screen, or the like.

The morphological analysis unit 24 performs morphological analysis on the source language sentence received by the receiving unit 23, thereby acquiring two or more POS-tagged elements. Note that the POS tag is information indicating part of speech. The morphological analysis unit 24 is, for example, Chasen (see URL: http://chasen.aist-nara.ac.jp/index.php?cmd=read&page=ProjectPractice2005&word=%A3%C3%A3%E8%A3%-E1%A3%F3%A3%E5%A3%EE), MeCab (see URL: http://mecab.sourceforge.net/), or the like. The morphological analysis technique is a known art, and, thus, a detailed description thereof has been omitted.

The labeled source language partial structure acquiring unit 25 acquires one or more labeled source language partial structures, from two or more elements contained in the source language sentence received by the receiving unit 23, using the one or more parsing models.

Typically, the labeled source language partial structure acquiring unit 25 uses an ITG parsing model to parse the source language sentence according to an existing parser algorithm (e.g., Berkeley parser (Improved inference for unlexicalized parsing. In NAACL-HLT, pages 404-411, Rochester, N.Y., April. Association for Computational Linguistics), thereby acquiring a source language syntactic structure. The ITG parsing model is built through learning from the orders of POS tags and words acquired by the morphological analysis unit 24, using the one or more parsing models.

In a case where a reordering label contained in the one or more labeled source language partial structures acquired by the labeled source language partial structure acquiring unit 25 is a reordering label indicating that the order of two child nodes contained in a target language partial structure is different from the order of two child nodes contained in a source language partial structure, the translation reordering unit 26 performs processing that reorders the two child nodes contained in a labeled source language partial structure corresponding to the reordering label, thereby acquiring two or more source language elements after reordering. It will be appreciated that the translation reordering unit 26 may not reorder two child nodes contained in all of the labeled source language partial structures. That is to say, in a case where the label is a label indicating that reordering is not to be performed, the translation reordering unit 26 does not reorder two child nodes contained in a source language partial structure corresponding to that label. The two or more source language elements after reordering may include an element that has not been reordered. The two or more source language elements are elements corresponding to nodes at terminal ends of the binary tree.

The search unit 27 acquires two or more target language elements respectively corresponding to the two or more source language elements acquired by the translation reordering unit, from the element pair storage unit 22. In this example, the two or more target language elements are two or more target language elements arranged in the order corresponding to the order of the two or more elements forming the source language sentence reordered by the translation reordering unit 26.

The output unit 28 outputs a target language sentence constituted by the two or more elements acquired by the search unit 27. In this example, output is a concept that encompasses display on a display screen, projection using a projector, printing by a printer, output of a sound, transmission to an external apparatus, accumulation in a storage medium, delivery of a processing result to another processing apparatus or another program, and the like.

The binary tree storage unit 21 and the element pair storage unit 22 are preferably a non-volatile storage medium, but may be realized also by a volatile storage medium. There is no limitation on the procedure in which the binary tree and the like are stored in the binary tree storage unit 21 and the like. For example, the binary tree and the like may be stored in the binary tree storage unit 21 and the like via a storage medium, the binary tree and the like transmitted via a communication line or the like may be stored in the binary tree storage unit 21 and the like, or the binary tree and the like input via an input device may be stored in the binary tree storage unit 21 and the like.

The morphological analysis unit 24, the labeled source language partial structure acquiring unit 25, the translation reordering unit 26, and the search unit 27 may be realized typically by an MPU, a memory, or the like. Typically, the processing procedure of the morphological analysis unit 24 and the like is realized by software, and the software is stored in a storage medium such as a ROM. Note that the processing procedure may be realized by hardware (a dedicated circuit).

The output unit 28 may be considered to include or not to include an output device such as a display screen or a loudspeaker. The output unit 28 may be realized, for example, by driver software for an output device, a combination of driver software for an output device and the output device, or the like.

Next, an operation of the translation apparatus 2 will be described with reference to the flowchart in FIG. 12.

(Step S1201) It is determined whether or not the receiving unit 23 has received a source language sentence. If the receiving unit 23 has received a source language sentence, the procedure advances to step S1202, otherwise, the procedure returns to step S1201.

(Step S1202) The morphological analysis unit 24 performs morphological analysis on the source language sentence received by the receiving unit 23, thereby acquiring two or more POS-tagged elements.

(Step S1203) The labeled source language partial structure acquiring unit acquires one or more labeled source language partial structures, from the two or more POS-tagged elements acquired by the morphological analysis unit 24, using the one or more parsing models of the source language sentence.

(Step S1204) The translation reordering unit 26 substitutes 1 for a counter i.

(Step S1205) The translation reordering unit 26 determines whether or not there is an i-$^{th}$ labeled source language partial structure. If there is an i-$^{th}$ labeled source language partial structure, the procedure advances to step S1206, otherwise, the procedure advances to step S1209.

(Step S1206) The translation reordering unit 26 determines whether or not the reordering label contained in the i-$^{th}$ labeled source language partial structure is a label indicating that the sibling nodes are to be reordered. If it is a label indicating that reordering is to be performed, the procedure advances to step S1207, otherwise, the procedure advances to step S1208.

(Step S1207) The translation reordering unit 26 reorders the sibling nodes contained in the i-$^{th}$ labeled source language partial structure.

(Step S1208) The translation reordering unit 26 increments the counter i by 1, and the procedure returns to step S1205.

(Step S1209) 1 is substituted for a counter i.

(Step S1210) The search unit 27 determines whether or not there is a node at an i-$^{th}$ terminal end (i-$^{th}$ element), in the binary tree constituted by the one or more labeled source language partial structures on which the processing by the translation reordering unit 26 is completed. If there is an i-$^{th}$ element, the procedure advances to step S1211, otherwise, the procedure advances to step S1213.

(Step S1211) The search unit 27 acquires a target language element corresponding to the i-$^{th}$ element, from the element pair storage unit 22. Note that, in this example, it is assumed that the target language elements are acquired in order of elements forming the sentence.

(Step S1212) The search unit 27 increments the counter i by 1, and the procedure returns to step S1210.

(Step S1213) The output unit 28 outputs a target language sentence constituted by the two or more elements acquired by the search unit 27 in step S1211, and the procedure returns to step S1201. The target language sentence is a sentence in which elements are arranged in the order corresponding to the order in which the search unit 27 acquired the elements.

Figure 12:
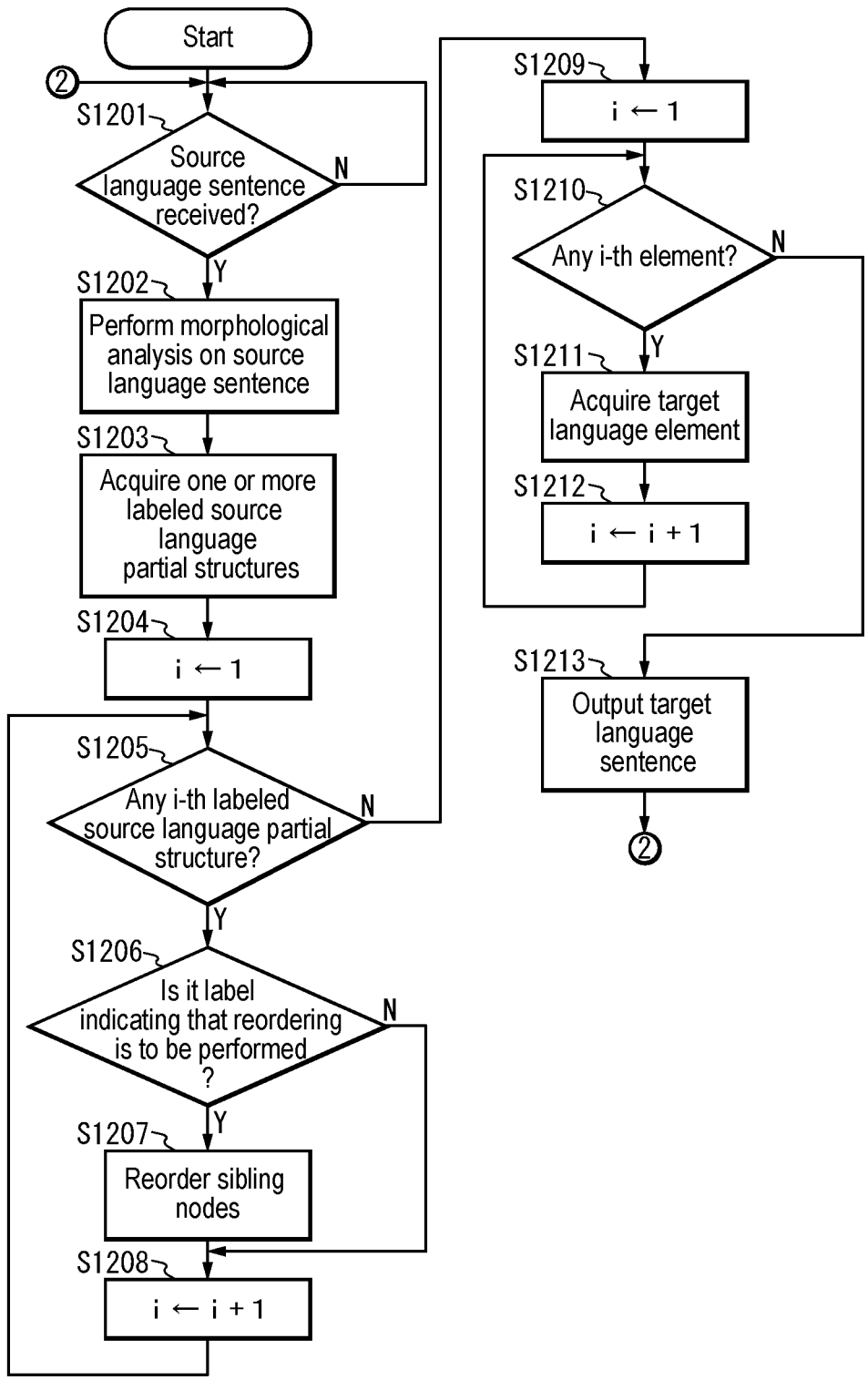
FIG. 12 is a flowchart illustrating an operation of the translation apparatus 2 in the embodiment.

Note that the procedure is terminated by powering off or an interruption at completion of the process in the flowchart in FIG. 12.

Hereinafter, a specific operation of the translation apparatus 2 in this embodiment will be described.

It is assumed that the translation apparatus 2 performs a Japanese-English translation. For example, it is assumed that the translation apparatus 2 is a machine translation apparatus for performing a statistical translation. Note that the translation apparatus 2 preferably performs a statistical translation, but it may perform a machine translation according to other methods.

Furthermore, it is assumed that, in the binary tree storage unit 21, a large number of binary trees as shown in FIG. 10 are stored. Each binary tree is a binary tree of a source language sentence having one or more labeled source language partial structures.

It is assumed that the user has input a source language sentence "anata wa kinou shinkan no hon wo kat ta" to the translation apparatus 2.

Next, the morphological analysis unit 24 performs morphological analysis on the source language sentence "anata wa kinou shinkan no hon wo kat ta" received by the receiving unit 23, thereby acquiring two or more POS-tagged elements.

Next, the labeled source language partial structure acquiring unit 25 acquires one or more labeled source language partial structures, from the two or more POS-tagged elements acquired by the morphological analysis unit 24, using one or more binary trees of the source language sentence. The binary tree having the one or more labeled source language partial structures acquired by the labeled source language partial structure acquiring unit 25 is a binary tree as shown in FIG. 13.

Figure 13:
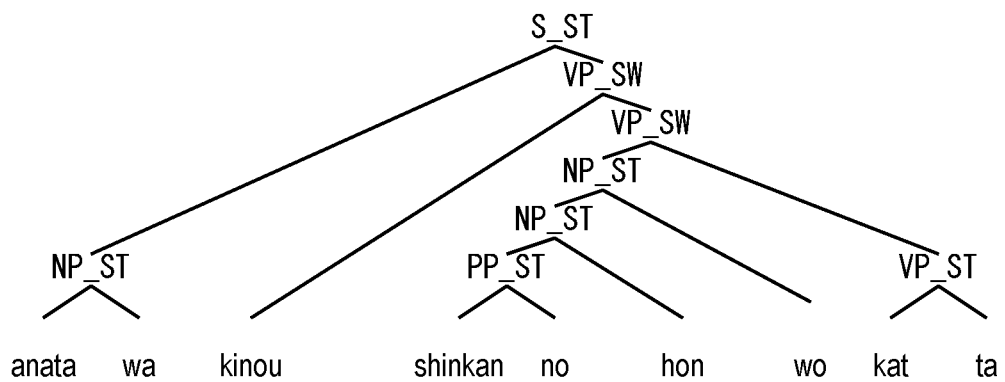
FIG. 13 is a diagram showing a binary tree having one or more labeled source language partial structures in the embodiment.

Next, the translation reordering unit 26 switches the sibling nodes of a labeled source language partial structure whose reordering label contained therein is a label indicating that the sibling nodes are to be reordered, among the labeled source language partial structures contained in the binary tree as shown in FIG. 13. Then, the order of the elements at the terminal ends of the binary tree (the order of the source language elements) "anata wa kat ta shinkan no hon wo kinou" as shown in 141 in FIG. 14 is acquired.

Figure 14:
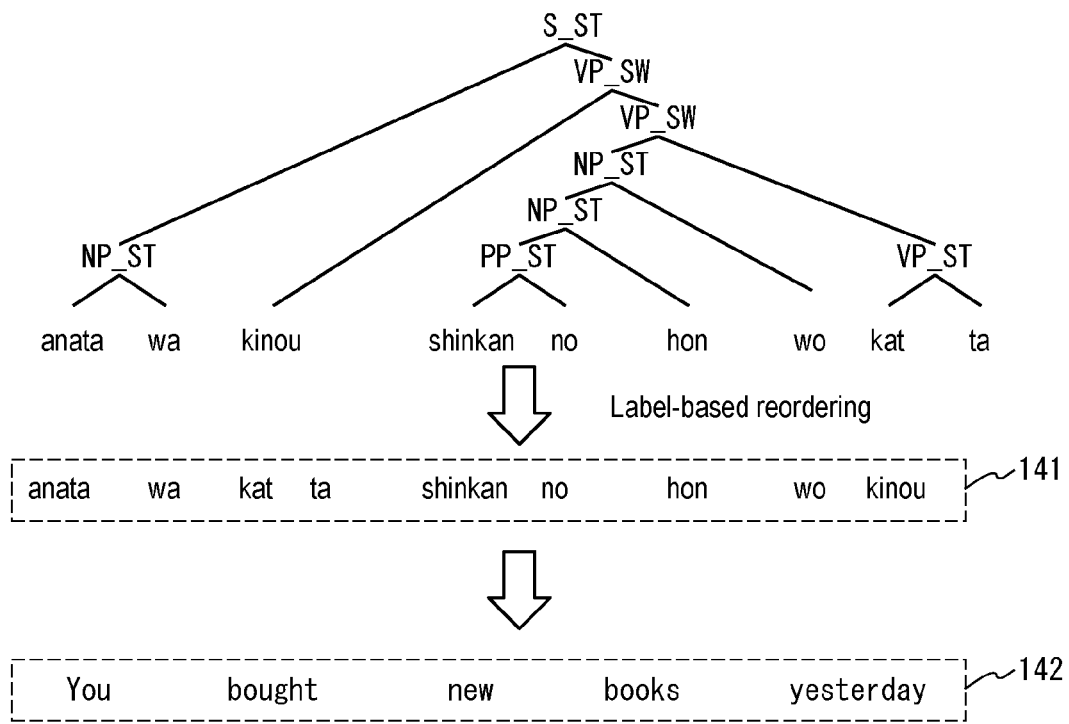
FIG. 14 is a diagram showing a result obtained by reordering words of a source language sentence in the word order of a target language in the embodiment.

The search unit 27 acquires target language elements respectively corresponding to the elements in 141 in FIG. 14, from the element pair storage unit 22. Thus, the search unit 27 acquires a target language sentence "you bought new books yesterday" (142 in FIG. 14).

Next, the output unit 28 outputs a target language sentence "you bought new books yesterday" constituted by the two or more elements acquired by the search unit 27.

Hereinafter, experimental results of the translation apparatus 2 will be described.

Experimental Results

In this experiment, the performance of the translation apparatus 2 in Japanese-English translations was evaluated. In this experiment, data of patent machine translation tasks in NTCIR-9 (see "Isao Goto, Bin Lu, Ka Po Chow, Eiichiro Sumita, and Benjamin K. Tsou. 2011. Overview of the patent machine translation task at the NTCIR-9 workshop. In Proceedings of NTCIR-9, pages 559-578.") and NTCIR-10 (see "Isao Goto, Ka Po Chow, Bin Lu, Eiichiro Sumita, and Benjamin K. Tsou. 2013a. Overview of the patent machine translation task at the NTCIR-10 workshop. In Proceedings of NTCIR-10, pages 260-286.") was used. NTCIR-9 and NTCIR-10 have the same training data and the same development data, and have different test data. For the training data, about 3180,000 conversation sentences were used. For the development data, about 2000 pairs of original and translated sentences were used. For the test data, 2000 sentences were used in NTCIR-9, and 2300 sentences were used in NTCIR-10.

In this experiment, in order to parse English sentences in the training data, Enju (see "Yusuke Miyao and Jun'ichi Tsujii. 2008. Feature forest models for probabilistic HPSG parsing. In Computational Linguistics, Volume 34, Number 1, pages 81-88.") was used.

Furthermore, in this experiment, customization for analyzing patent sentences (see "Hideki Isoacid, Katsu Hito Sodom, Hajime Tsoumada, and Kevin Duh. 2012. HPSG-based preprocessing for English-to-Japanese translation. ACM Transactions on Asian Language Information Processing, 11(3):8:1-8:16, September.") was applied.

Furthermore, MeCab was used as a Japanese morphological analyzer. As in the case of English, tokenization of alphanumeric characters in Japanese was applied.

Furthermore, as a translation model, a model was used that was obtained by training using pairs of original and translated sentences where each English sentence was within 40 words. As a result, about 2060,000 pairs of original and translated sentences were used for training the translation model. In this experiment, in order to construct a word alignment (the above-described element pair storage unit 12), GIZA++ and growdiag-final- and heuristics were used. In this experiment, in order to reduce word alignment errors, English articles (a, an, the) and Japanese particles (ga, wo, wa) were removed. In this experiment, after the word alignment, the removed words were returned to their original positions.

In this experiment, 5-gram language models trained using English sentences from the training data were used.

Furthermore, SMT weight parameters were tuned with MERT (see "Franz Josef Och. 2003. Minimum error rate training in statistical machine translation. In Proceedings of the 41st Annual Meeting of the Association for Computational Linguistics, pages 160-167.") using development data. Specifically, in this experiment, in order to stabilize the MERT results, the weight parameters were tuned three times with MERT using the first half of the development data. Then, an SMT weight parameter set with the best score was selected from among the three weight parameter sets based on BLEU scores when the second half of the development data was used.

This method (the method of the translation apparatus 2) may be hereinafter referred to as "PROPOSED". A full binary tree structure of the source language used as the training data for the preordering model of this method was constructed from 200,000 source language sentences. These 200,000 source language sentences were selected as follows. First, source language training sentences were sorted based on the coverage rate of the source language spans acquired via word alignment from the target language syntactic structure. Next, the top 200,000 unique source language sentences were selected. In order to construct a full binary tree structure, the processing was repeated 20 times using the Gibbs sampler. In this example, the coverage rate was calculated by "number of projected spans/(number of words in sentence−1)".

Furthermore, for training of the preordering model in this method, a Berkeley parser was used. Also, for a translation from F' (sentence obtained by reordering the source language sentence in the word order of the target language sentence (see 141 in FIG. 14, for example)) to E (the target language sentence), phrase-based SMT system "Moses (see "Philipp Koehn, Hieu Hoang, Alexandra Birch, Chris Callison-Burch, Marcello Federico, Nicola Bertoldi, Brooke Cowan, Wade Shen, Christine Moran, Richard Zens, Chris Dyer, Ondrej Bojar, Alexandra Constantin, and Evan Herbst. 2007. Moses: Opensource toolkit for statistical machine translation. In Proceedings of the ACL Demo and Poster Sessions, pages 177-180.")" was used. In this case, the distortion threshold was set to 6. Note that the distortion threshold limits a relative position between a phrase that was translated last and a phrase that is to be translated next, in an input sentence when successively generating a target language sentence from the left, and is a threshold used to limit a translation such that the absolute value of "position of leftmost word in phrase that is to be translated next−position of rightmost word in phrase that was translated last−1" is not greater than the threshold. If this value is small (e.g., 6), long-distance word reordering is not performed in the translation.

In this experiment, this method was compared with the following five methods.

(1) Phrase-based SMT using a word reordering model ($PBMT_L$) (see "Philipp Koehn, Hieu Hoang, Alexandra Birch, Chris Callison Burch, Marcello Federico, Nicola Bertoldi, Brooke Cowan, Wade Shen, Christine Moran, Richard Zens, Chris Dyer, Ondrej Bojar, Alexandra Constantin, and Evan Herbst. 2007. Moses: Open source toolkit for statistical machine translation.")

(2) Hierarchical phrase-based SMT (HPBMT) (see "David Chiang. 2007. Hierarchical phrase-based translation. Computational Linguistics, 33(2): 201-228.")

(3) String-to-tree syntax-based SMT (SBMT) (see "Hieu Hoang, Philipp Koehn, and Adam Lopez. 2009. A Unified Framework for Phrase Based, Hierarchical, and Syntax Based Statistical Machine Translation. In Proceedings of IWSLT 2009, pages 152-159.")

(4) Phrase-based SMT using a distortion model ($PBMT_D$) (see "Isao Goto, Masao Utiyama, Eiichiro Sumita, Akihiro Tamura, and Sadao Kurohashi. 2013b. Distortion model considering rich context for statistical machine translation. In Proceedings of the 51st Annual Meeting of the Association for Computational Linguistics, Sofia, Bulgaria, August. Association for Computational Linguistics.")

(5) Preordering method without using a parser (LADER) (see "Graham Neubig, Taro Watanabe, and Shinsuke Mori. 2012. Inducing a discriminative parser to optimize machine translation reordering. In Proceedings of the 2012 Joint Conference on Empirical Methods in Natural Language Processing and Computational Natural Language Learning, pages 843-853, Jeju Island, Korea, July. Association for Computational Linguistics.")

Moses was used for $PBMT_L$, HPBMT, SBMT, and LADER. An in-house standard phrase-based SMT compatible with the Moses decoder having a distortion model was used for $PBMT_D$.

The MSD bidirectional word reordering model was built using all of the data, and was used to build the translation model. As for the MSD bidirectional word reordering model, see the manual of the Moses decoder.

For the training data of the $PBMT_D$ distortion model, the last 200,000 source language sentences in the data for building the translation model were used.

Furthermore, for the LADER preordering system, lader (see "http://www.phontron.com/lader/") implementation was used. For the training data for the LADER preordering model, 200,000 source language sentences that were the same as those for the training data for the preordering model in this approach were used. POS tags in Japanese were generated by MeCab. The repetitive training was repeated 100 times in the training of the LADER preordering model.

The distortion threshold in $PBMT_L$ was set to 20. The max-chart-span was not limited for HPBMT and SBMT. As for the max-chart-span, see the manual of the Moses decoder. The distortion threshold in LADER was set to 6. The default values were set to parameters used in other systems.

Under the above-described conditions, case-sensitive BLEU-4 (see Kishore Papineni, Salim Roukos, ToddWard, and WeiJing Zhu. 2002. Bleu: a Method for Automatic Evaluation of Machine Translation. In Proceedings of ACL 2002, pages 311-318.") and RIBES v1.01 (see "Hideki Isoacid, Tsutomu Hirao, Kevin Duh, Katsu Hito Sodom, and Hajime Tsoumada. 2010. Automatic Evaluation of Translation Quality for Distant Language Pairs. In Proceedings of the 2010 Conference on Empirical Methods in Natural Language Processing, pages 944-952.") were used to evaluate the translation quality. FIG. 15 shows evaluation results of the translation quality.

In FIG. 15, a check is added to methods using a parser. Furthermore, a check is added to preordering methods. FIG. 15 shows RIBES scores and BLEU scores in each approach in the case of using NTCIR-9 and NTCIR-10 data.

It is seen from FIG. 15 that the proposed approach (the approach of the translation apparatus 2) outperformed the other methods because it achieved the best scores.

Note that RIBES is sensitive to global word order, and BLEU is sensitive to local word order. With this experiment, it was confirmed that this approach was effective for both the global and local word orders.

In this experiment, this approach (PROPOSED) was compared with the other three approaches ($PBMT_L$, HPBMT, $PBMT_D$) for simultaneously performing word selection and reordering without using a parser. As a result, as shown in FIG. 15, this approach outperformed the other three approaches in both NTCIR-9 data and NTCIR-10 data and in both RIBES and BLEU scores. These results show that the preordering is more effective than the approaches for simultaneously performing word selection and reordering without using a parser.

Next, in this experiment, this approach (PROPOSED) was compared with the method using a target language parser (SBMT). As a result, as shown in FIG. 15, this approach outperformed the SBMT approach in both NTCIR-9 data and NTCIR-10 data and in both RIBES and BLEU scores. These results show that the preordering is more effective than the approaches for simultaneously performing word selection and reordering using a target language parser.

Lastly, in this experiment, this approach (PROPOSED) was compared with the preordering approach without using a parser (LADER). As a result, as shown in FIG. 15, this approach outperformed the LADER approach in both NTCIR-9 data and NTCIR-10 data and in both RIBES and BLEU scores. These results show that using a parser for the preordering is more effective than not using the parser.

As described above, according to this embodiment, it is possible to realize an accurate translation by performing a machine translation with the preordering using a target language parser.

The software that realizes the translation apparatus 2 in this embodiment may be the following sort of program. Specifically, this program is a program for causing a computer-accessible storage medium to have: a binary tree storage unit in which one or more binary trees of a source language sentence having one or more labeled source language partial structures accumulated by the learning apparatus according to any one of claims 1 to 3 are stored; and an element pair storage unit in which one or more element pairs are stored, each of the pairs being a pair of a source language element and a target language element; and causing a computer to function as: a receiving unit that receives a source language sentence; a labeled source language partial structure acquiring unit that acquires one or more labeled source language partial structures, from two or more elements contained in the source language sentence received by the receiving unit, using one or more binary trees of the source language sentence; a translation reordering unit that, in a case where a reordering label contained in the one or more labeled source language partial structures is a reordering label indicating that the order of two child nodes contained in a target language partial structure is different from the order of two child nodes contained in a source language partial structure, performs processing that reorders the two child nodes contained in a labeled source language partial structure corresponding to the reordering label, thereby acquiring two or more source language elements after reordering; a search unit that acquires, from the element pair storage unit, two or more target language elements respectively corresponding to the two or more source language elements acquired by the translation reordering unit; and an output unit that outputs a target language sentence constituted by the two or more elements acquired by the search unit.

It is preferable that the program causes the computer to operate such that source language elements contained in one or more labeled source language partial structures forming one or more binary trees of the source language sentence are POS-tagged, the computer is caused to further function as a morphological analysis unit that performs morphological analysis on the source language sentence received by the receiving unit, thereby acquiring two or more POS-tagged elements, and the labeled source language partial structure acquiring unit acquires one or more labeled source language partial structures from the two or more POS-tagged elements, using the one or more binary trees of the source language sentence.

Figure 16:
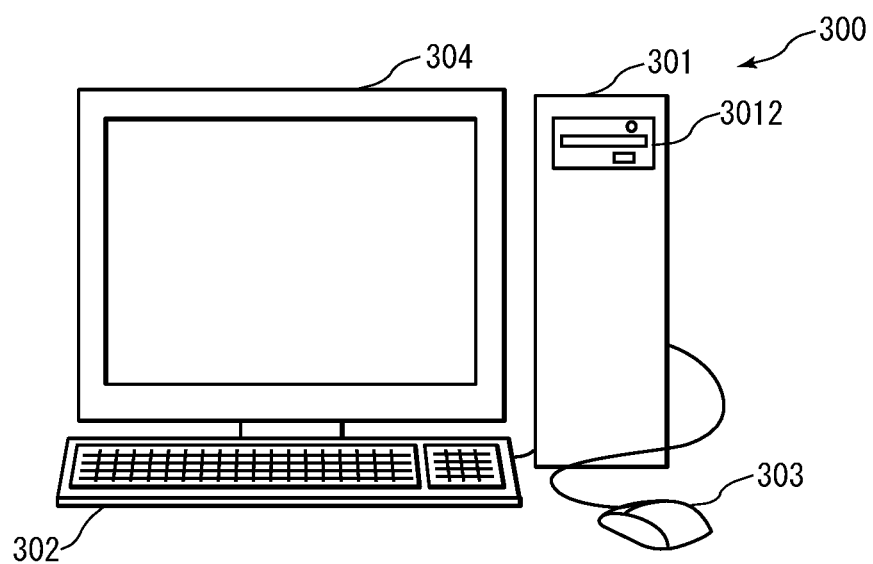
FIG. 16 is a schematic view of a computer system in the embodiments.
Figure 17:
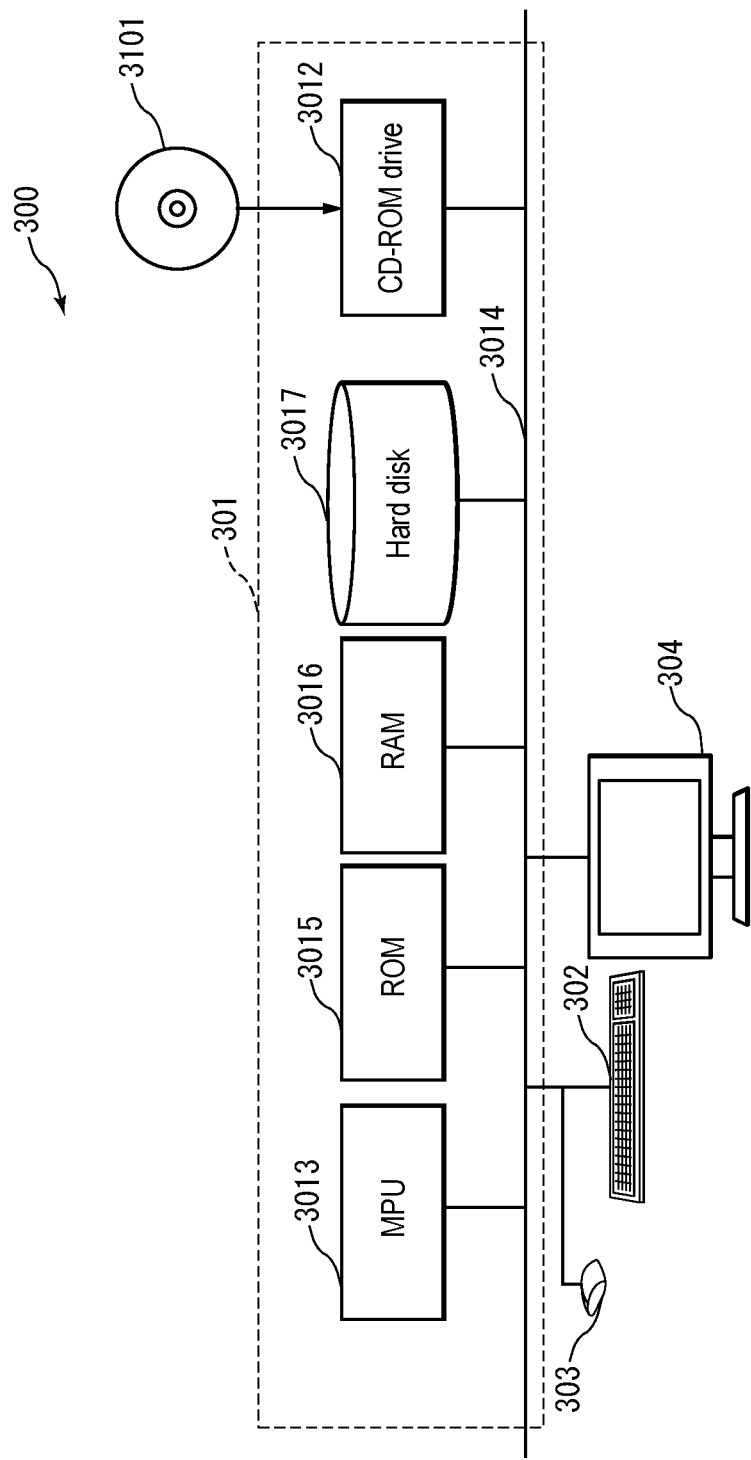
FIG. 17 is a block diagram of the computer system in the embodiments.

FIG. 16 shows the external appearance of a computer that executes the programs described in the present invention to realize the learning apparatus 1 or the translation apparatus 2 in the foregoing various embodiments. The foregoing embodiments may be realized using computer hardware and a computer program executed thereon. FIG. 16 is a schematic view of a computer system 300. FIG. 17 is a block diagram of the computer system 300.

In FIG. 16, the computer system 300 includes a computer 301 including a CD-ROM drive, a keyboard 302, a mouse 303, and a monitor 304.

In FIG. 17, the computer 301 includes not only the CD-ROM drive 3012, but also an MPU 3013, a bus 3014 connected to the MPU 3013 and the CD-ROM drive 3012, a ROM 3015 in which a program such as a boot up program is to be stored, a RAM 3016 that is connected to the MPU 3013 and is a memory in which a command of an application program is temporarily stored and a temporary storage area is to be provided, and a hard disk 3017 in which an application program, a system program, and data are to be stored. Although not shown, the computer 301 may further include a network card that provides connection to a LAN.

The program for causing the computer system 300 to execute the functions of the learning apparatus and the like in the foregoing embodiments may be stored in a CD-ROM 3101 that is inserted into the CD-ROM drive 3012, and be transmitted to the hard disk 3017. Alternatively, the program may be transmitted via a network (not shown) to the computer 301 and stored in the hard disk 3017. At the time of execution, the program is loaded into the RAM 3016. The program may be loaded from the CD-ROM 3101, or directly from a network.

The program does not necessarily have to include, for example, an operating system (OS) or a third party program to cause the computer 301 to execute the functions of the learning apparatus and the like in the foregoing embodiments. The program may only include a command portion to call an appropriate function (module) in a controlled mode and obtain the desired results. The manner in which the computer system 300 operates is well known, and, thus, a detailed description thereof has been omitted.

Furthermore, the computer that executes this program may be a single computer, or may be multiple computers. That is to say, centralized processing may be performed, or distributed processing may be performed.

Furthermore, in the foregoing embodiments, each processing or each function may be realized as centralized processing using a single apparatus or a single system, or may be realized as distributed processing using multiple apparatuses.

Note that the invention of the present application is not limited to the embodiments set forth herein and may be variously modified in practice without departing from the gist of the present invention, and such modifications are also encompassed in the scope of the invention.

Furthermore, the foregoing embodiments include inventions in various stages, and various inventions can be extracted by combining as appropriate multiple constituent elements disclosed therein. For example, if the problems described in "Technical Problem" can be solved and the effects described in "Advantageous Effects of Invention" can be obtained even in the case where some constituent elements are deleted from all constituent elements described in the embodiments, configurations in which these constituent elements are deleted are extracted as the inventions.

INDUSTRIAL APPLICABILITY

As described above, the learning apparatus according to the present invention has an effect that an accurate translation can be realized, and, thus, this apparatus is useful as a machine translation apparatus and the like.

LIST OF REFERENCE NUMERALS

1 Learning apparatus
2 Translation apparatus
10 Storage medium
11 Parallel corpus
12, 22 Element pair storage unit
13 Statistical model storage unit
14 Parser unit
15 Source language element acquiring unit
16, 25 Source language partial structure acquiring unit
17 Reordering unit
18 Labeling unit
19 Model building unit
20 Accumulating unit
21 Binary tree storage unit
23 Receiving unit
24 Morphological analysis unit
26 Translation reordering unit
27 Search unit
28 Output unit
161 Source language partial structure acquiring part
162 Partial structure complementing part

The invention claimed is:

1. A learning apparatus, comprising:
one or more non-transitory storage media; and
a computer, wherein:
the one or more non-transitory storage media includes:
  a parallel corpus in which one or more pairs of original and translated sentences are stored, each of the one or more pairs having a source language sentence and a target language sentence that is a result obtained by translating the source language sentence;
  an element pair storage unit in which one or more element pairs are stored, each of the one or more element pairs being a pair of a source language element and a target language element; and
  a program,
the program, when executed by the computer, causes the computer to function as:
  a parser unit that parses the target language sentence contained in the one or more pairs of original and translated sentences, thereby acquiring a binary tree of the target language sentence, the binary tree having one or more target language partial structures, each of which indicates the order of two or more elements forming the target language sentence and contains a parent node having a phrase label, and two child nodes, each of which is a child node of the parent node and has a target language phrase label or a target language element;
  a source language element acquiring unit that acquires, from the one or more element pairs in the element pair storage unit, one or more elements forming the source language sentence corresponding to the target language sentence, the one or more elements being one or more source language elements corresponding to target language elements that are child nodes at terminal ends of the one or more target language partial structures contained in the binary tree of the target language sentence;

a source language partial structure acquiring unit that applies a structure indicated by the one or more target language partial structures contained in the binary tree of the target language sentence, to the one or more source language elements forming the source language sentence, thereby acquiring one or more source language partial structures, each of which indicates the order of two or more elements forming the source language sentence and contains a parent node having a phrase label, and two child nodes, each of which is a child node of the parent node and has a phrase label or a source language POS tag;

a labeling unit that provides the one or more source language partial structures with a reordering label that is a label that enables to distinguish a source language partial structure, in which the order of two child nodes contained in a source language partial structure corresponding to a target language partial structure is different from the order of two child nodes contained in the target language partial structure from a source language partial structure, in which the order of two child nodes contained in a source language partial structure corresponding to a target language partial structure is the same as the order of two child nodes contained in the target language partial structure, thereby acquiring one or more labeled source language partial structures;

a model building unit that builds one or more parsing models each having appearance probability information regarding a labeled source language partial structure, using the one or more labeled source language partial structures;

an accumulating unit that causes the one or more non-transitory storage media to accumulate the one or more parsing models built by the model building unit; and a reordering unit that acquires, using the one or more source language partial structures each indicating the order of two or more elements forming the source language sentence, one or more source language partial structures, in each of which the two or more elements forming the source language sentence are reordered such that the order is close enough to satisfy a predetermined condition with respect to the order of the elements in the target language sentence, wherein the labeling unit provides the reordering label to the one or more source language partial structures reordered by the reordering unit.

2. The learning apparatus according to claim 1, wherein:
the one or more non-transitory storage media further includes a statistical model storage unit in which a CFG rule statistical model is stored, the statistical model containing a parent node having a phrase label, and two child nodes, each of which is a child node of the parent node and has a phrase label or a source language part-of-speech tag, and
the source language partial structure acquiring unit includes:

a source language partial structure acquiring part that applies a structure indicated by the one or more target language partial structures contained in the binary tree of the target language sentence, to the one or more source language elements forming the source language sentence, thereby acquiring one or more source language partial structures, each of which indicates the order of two or more elements forming the source language sentence and contains a parent node having a phrase label, and two child nodes each of which is a child node of the parent node and has a phrase label or a source language element; and a partial structure complementing part that, in a case where there is an incomplete source language partial structure among the one or more source language partial structures acquired by the source language partial structure acquiring part, applies the statistical model to the source language partial structure, thereby acquiring a complete source language partial structure.

3. A translation apparatus, comprising:
one or more non-transitory storage media; and
a computer, wherein:
the one or more non-transitory storage media includes:
  a binary tree storage unit in which one or more parsing models accumulated by the learning apparatus according to claim 1 are stored;
  an element pair storage unit in which one or more element pairs are stored, each of the one or more element pairs being a pair of a source language element and a target language element; and
  a program,
the program, when executed by the computer, causes the computer to function as:
  a receiving unit that receives a source language sentence;
  a labeled source language partial structure acquiring unit that acquires one or more labeled source language partial structures, from two or more elements contained in the source language sentence received by the receiving unit, using the one or more parsing models;
  a translation reordering unit that, in a case where a reordering label contained in the one or more labeled source language partial structures is a reordering label indicating that the order of two child nodes contained in a target language partial structure is different from the order of two child nodes contained in a source language partial structure, performs processing that reorders the two child nodes contained in a labeled source language partial structure corresponding to the reordering label, thereby acquiring two or more source language elements after reordering;
  a search unit that acquires, from the element pair storage unit, two or more target language elements respectively corresponding to the two or more source language elements after reordering; and
  an output unit that outputs, to at least one selected from the group consisting of a display, a projector, a printer, an external apparatus, a storage medium and another processing apparatus, or outputs as a sound, a target language sentence constituted by the two or more target language elements acquired by the search unit, in which the two or more target language elements corresponding to the two or more source language elements are arranged in the same order as the order of the source language elements after reordering.

4. A learning method using a computer and one or more non-transitory storage media, the one or more non-transitory storage media including:
   a parallel corpus in which one or more pairs of original and translated sentences are stored, each of the one or more pairs having a source language sentence and a target language sentence that is a result obtained by translating the source language sentence; and
   an element pair storage unit in which one or more element pairs are stored, each of the one or more element pairs being a pair of a source language element and a target language element;
   the learning method, which is realized by the computer functioning a parser unit, a source language element acquiring unit, a source language partial structure acquiring unit, a labeling unit, a model building unit, an accumulating unit, and a reordering unit, comprising:
   a parsing step of the parser unit parsing the target language sentence contained in the one or more pairs of original and translated sentences, thereby acquiring a binary tree of the target language sentence, the binary tree having one or more target language partial structures, each of which indicates the order of two or more elements forming the target language sentence and contains a parent node having a phrase label, and two child nodes, each of which is a child node of the parent node and has a phrase label or a target language element;
   a source language element acquiring step of the source language element acquiring unit acquiring, from the one or more element pairs in the element pair storage unit, one or more elements forming the source language sentence corresponding to the target language sentence, the one or more elements being one or more source language elements corresponding to target language elements that are child nodes at terminal ends of the one or more target language partial structures contained in the binary tree of the target language sentence;
   a source language partial structure acquiring step of the source language partial structure acquiring unit applying a structure indicated by the one or more target language partial structures contained in the binary tree of the target language sentence, to the one or more source language elements forming the source language sentence, thereby acquiring one or more source language partial structures, each of which indicates the order of two or more elements forming the source language sentence and contains a parent node having a phrase label, and two child nodes, each of which is a child node of the parent node and has a phrase label or a source language element;
   a labeling step of the labeling unit providing the one or more source language partial structures with a reordering label that is a label that makes it possible to distinguish a source language partial structure in which the order of two child nodes contained in a source language partial structure corresponding to a target language partial structure is different from the order of two child nodes contained in the target language partial structure from a source language partial structure in which the order of two child nodes contained in a source language partial structure corresponding to a target language partial structure is the same as the order of two child nodes contained in the target language partial structure, thereby acquiring one or more labeled source language partial structures;
   a model building step of the model building unit building one or more parsing models each having appearance probability information regarding a labeled source language partial structure, using the one or more labeled source language partial structures;
   an accumulating step of the accumulating unit causing the one or more non-transitory storage media to accumulate the one or more parsing models built in the model building step; and
   a reordering step of the reordering unit acquiring, using the one or more source language partial structures each indicating the order of two or more elements forming the source language sentence, one or more source language partial structures, in each of which the two or more elements forming the source language sentence are reordered such that the order is close enough to satisfy a predetermined condition with respect to the order of the elements in the target language sentence,
   wherein, in the labeling step, the reordering label is provided to the one or more source language partial structures reordered by the reordering unit.

5. A non-transitory computer-accessible storage medium in which a program is stored,
   the program, when executed by a computer:
   causes one or more non-transitory storage media to have:
      a parallel corpus in which one or more pairs of original and translated sentences are stored, each of the one or more pairs having a source language sentence and a target language sentence that is a result obtained by translating the source language sentence; and
      an element pair storage unit in which one or more element pairs are stored, each of the one of more element pairs being a pair of a source language element and a target language element; and
   causes the computer to function as:
      a parser unit that parses the target language sentence contained in the one or more pairs of original and translated sentences, thereby acquiring a binary tree of the target language sentence, the binary tree having one or more target language partial structures, each of which indicates the order of two or more elements forming the target language sentence and contains a parent node having a phrase label, and two child nodes, each of which is a child node of the parent node and has a phrase label or a target language element;
      a source language element acquiring unit that acquires, from the one or more element pairs in the element pair storage unit, one or more elements forming the source language sentence corresponding to the target language sentence, the one or more elements being one or more source language elements corresponding to target language elements that are child nodes at terminal ends of the one or more target language partial structures contained in the binary tree of the target language sentence;
      a source language partial structure acquiring unit that applies a structure indicated by the one or more target language partial structures contained in the binary tree of the target language sentence, to the one or more source language elements forming the source language sentence, thereby acquiring one or more source language partial structures each of which indicates the order of two or more elements forming the source language sentence and contains a parent node having a phrase label, and two child nodes, each of which is a child node of the parent node and has a phrase label or a source language element;

a labeling unit that provides the one or more source language partial structures with a reordering label that is a label that makes it possible to distinguish a source language partial structure in which the order of two child nodes contained in a source language partial structure corresponding to a target language partial structure is different from the order of two child nodes contained in the target language partial structure from a source language partial structure in which the order of two child nodes contained in a source language partial structure corresponding to a target language partial structure is the same as the order of two child nodes contained in the target language partial structure, thereby acquiring one or more labeled source language partial structures;

a model building unit that builds one or more parsing models each having appearance probability information regarding a labeled source language partial structure, using the one or more labeled source language partial structures; and an accumulating unit that causes the one or more non-transitory storage media to accumulate the one or more parsing models built by the model building unit, wherein the one or more non-transitory storage media further includes:

a statistical model storage unit in which a CFG rule statistical model is stored, the statistical model containing a parent node having a phrase label, and two child nodes each of which is a child node of the parent node and has a phrase label or a source language part-of-speech tag, and the source language partial structure acquiring unit includes:

a source language partial structure acquiring part that applies a structure indicated by the one or more target language partial structures contained in the binary tree of the target language sentence, to the one or more source language elements forming the source language sentence, thereby acquiring one or more source language partial structures, each of which indicates the order of two or more elements forming the source language sentence and contains a parent node having a phrase label, and two child nodes, each of which is a child node of the parent node and has a phrase label or a source language element; and a partial structure complementing part that, in a case where there is an incomplete source language partial structure among the one or more source language partial structures acquired by the source language partial structure acquiring part, applies the statistical model to the source language partial structure, thereby acquiring a complete source language partial structure.

6. A non-transitory computer-accessible storage medium in which a program is stored, the program, when executed by a computer:

causes one or more non-transitory storage media to have:

a binary tree storage unit in which one or more parsing models accumulated by the learning apparatus according to claim 1 are stored; and an element pair storage unit in which one or more element pairs are stored, each of the pairs being a pair of a source language element and a target language element; and causes the computer to function as:

a receiving unit that receives a source language sentence;

a labeled source language partial structure acquiring unit that acquires one or more labeled source language partial structures, from two or more elements contained in the source language sentence received by the receiving unit, using the one or more parsing models;

a translation reordering unit that, in a case where a reordering label contained in the one or more labeled source language partial structures is a reordering label indicating that the order of two child nodes contained in a target language partial structure is different from the order of two child nodes contained in a source language partial structure, performs processing that reorders the two child nodes contained in a labeled source language partial structure corresponding to the reordering label, thereby acquiring two or more source language elements after reordering;

a search unit that acquires, from the element pair storage unit, two or more target language elements respectively corresponding to the two or more source language elements acquired by the translation reordering unit; and an output unit that outputs, to at least one selected from the group consisting of a display, a projector, a printer, an external apparatus, a storage medium and another processing apparatus, or outputs as a sound, a target language sentence constituted by the two or more elements acquired by the search unit.

7. A translation apparatus, comprising:

one or more non-transitory storages; and a computer, wherein:

the one or more non-transitory storages includes:

a binary tree storage unit in which one or more parsing models accumulated by the learning apparatus according to claim 2 are stored;

an element pair storage unit in which one or more element pairs are stored, each of the pairs being a pair of a source language element and a target language element;

a receiving unit that receives a source language sentence; and a program, the program, when executed by the computer, causes the computer to function as:

a labeled source language partial structure acquiring unit that acquires one or more labeled source language partial structures, from two or more elements contained in the source language sentence received by the receiving unit, using the one or more parsing models;

a translation reordering unit that, in a case where a reordering label contained in the one or more labeled source language partial structures is a reordering label indicating that the order of two child nodes contained in a target language partial structure is different from the order of two child nodes contained in a source language partial structure, performs processing that reorders the two child nodes contained in a labeled source language partial structure corresponding to the reordering label, thereby acquiring two or more source language elements after reordering;

a search unit that acquires, from the element pair storage unit, two or more target language elements respectively corresponding to the two or more source language elements after reordering; and an output unit that outputs, to at least one selected from the group consisting of a display, a projector, a printer, an external apparatus, a storage medium and another processing apparatus, or outputs as a sound, a target language sentence constituted by the two or more target language elements acquired by the search unit, in which the two or more target language elements corresponding to the two or more source language elements are arranged in the same order as the order of the source language elements after reordering.

8. A non-transitory computer-accessible storage medium in which a program is stored, the program, when executed by a computer:

causes one or more non-transitory storage media to have:

a binary tree storage unit in which one or more parsing models accumulated by the learning apparatus according to claim 2 are stored; and an element pair storage unit in which one or more element pairs are stored, each of the pairs being a pair of a source language element and a target language element; and causes the computer to function as:

a receiving unit that receives a source language sentence;

a labeled source language partial structure acquiring unit that acquires one or more labeled source language partial structures, from two or more elements contained in the source language sentence received by the receiving unit, using the one or more parsing models;

a translation reordering unit that, in a case where a reordering label contained in the one or more labeled source language partial structures is a reordering label indicating that the order of two child nodes contained in a target language partial structure is different from the order of two child nodes contained in a source language partial structure, performs processing that reorders the two child nodes contained in a labeled source language partial structure corresponding to the reordering label, thereby acquiring two or more source language elements after reordering;

a search unit that acquires, from the element pair storage unit, two or more target language elements respectively corresponding to the two or more source language elements acquired by the translation reordering unit; and an output unit that outputs, to at least one selected from the group consisting of a display, a projector, a printer, an external apparatus, a storage medium and another processing apparatus, or outputs as a sound, a target language sentence constituted by the two or more elements acquired by the search unit.

* * * * *